(12) United States Patent
Yamasaki et al.

(10) Patent No.: US 8,467,282 B2
(45) Date of Patent: Jun. 18, 2013

(54) OPTICAL DISC DEVICE, OPTICAL HEAD, AND INFORMATION PROCESSING DEVICE

(75) Inventors: Fumitomo Yamasaki, Nara (JP); Eishin Mori, Tokyo (JP)

(73) Assignee: Panasonic Corporation, Osaka (JP)

( * ) Notice: Subject to any disclaimer, the term of this patent is extended or adjusted under 35 U.S.C. 154(b) by 743 days.

(21) Appl. No.: 12/681,820

(22) PCT Filed: Aug. 3, 2009

(86) PCT No.: PCT/JP2009/003687
§ 371 (c)(1),
(2), (4) Date: Apr. 6, 2010

(87) PCT Pub. No.: WO2010/016226
PCT Pub. Date: Feb. 11, 2010

(65) Prior Publication Data
US 2010/0246343 A1    Sep. 30, 2010

(30) Foreign Application Priority Data

Aug. 7, 2008  (JP) .................................. 2008-204001

(51) Int. Cl.
G11B 7/00 (2006.01)
(52) U.S. Cl.
USPC .................................. 369/112.08; 369/44.23
(58) Field of Classification Search
None
See application file for complete search history.

(56) References Cited

U.S. PATENT DOCUMENTS

| | | | |
|---|---|---|---|
| 7,164,638 B2 | 1/2007 | Wada et al. | |
| 2004/0190400 A1 | 9/2004 | Wada et al. | |
| 2005/0078574 A1 | 4/2005 | Wada et al. | |
| 2005/0135208 A1* | 6/2005 | Takeuchi | 369/44.27 |
| 2005/0243674 A1 | 11/2005 | Hirai | |
| 2007/0104045 A1 | 5/2007 | Nagura | |

FOREIGN PATENT DOCUMENTS

| | | |
|---|---|---|
| JP | 11-259906 | 9/1999 |
| JP | 2004-281035 | 10/2004 |

(Continued)

OTHER PUBLICATIONS

International Search Report issued Oct. 27, 2009 in International (PCT) Application No. PCT/JP2009/003687.

*Primary Examiner* — Joseph Feild
*Assistant Examiner* — Carl Adams
(74) *Attorney, Agent, or Firm* — Wenderoth, Lind & Ponack, L.L.P.

(57) ABSTRACT

An object of the invention is to provide an optical disc device, an optical head, and an information processing device that enable to advantageously record or reproduce information with respect to an information recording medium having three or more information recording surfaces with light transmissive layers of different thicknesses from each other. Assuming that an aberration amount of third-order coma aberration resulting from tilting a multilayer optical disc (60) by a unit angle is $CMD0$ (unit: m$\lambda$/deg), an aberration amount of third-order coma aberration resulting from tilting an objective lens (8) by a unit angle is $CML0$ (unit: m$\lambda$/deg), a tilt angle of the multilayer optical disc (60) is $\theta$, a coefficient is $k0$, and a tilt angle of the objective lens (8) by an objective lens actuator (9) is $\alpha 0$ in converging laser light on an information recording surface having a largest light transmissive layer thickness out of the information recording surfaces of the multilayer optical disc (60), the objective lens actuator (9) tilts the objective lens (8) in such a manner that the tilt angle $\alpha 0$ of the objective lens (8) satisfies the following mathematical expression:

$$\alpha 0 = \theta \times k0 \times CMD0 / CML0, \text{ where } 0.5 < k0 < 0.9.$$

16 Claims, 17 Drawing Sheets

FOREIGN PATENT DOCUMENTS

| JP | 2005-209283 | 8/2005 |
| JP | 2006-228273 | 8/2006 |
| JP | 2007-133967 | 5/2007 |
| WO | 03/075266 | 9/2003 |

* cited by examiner

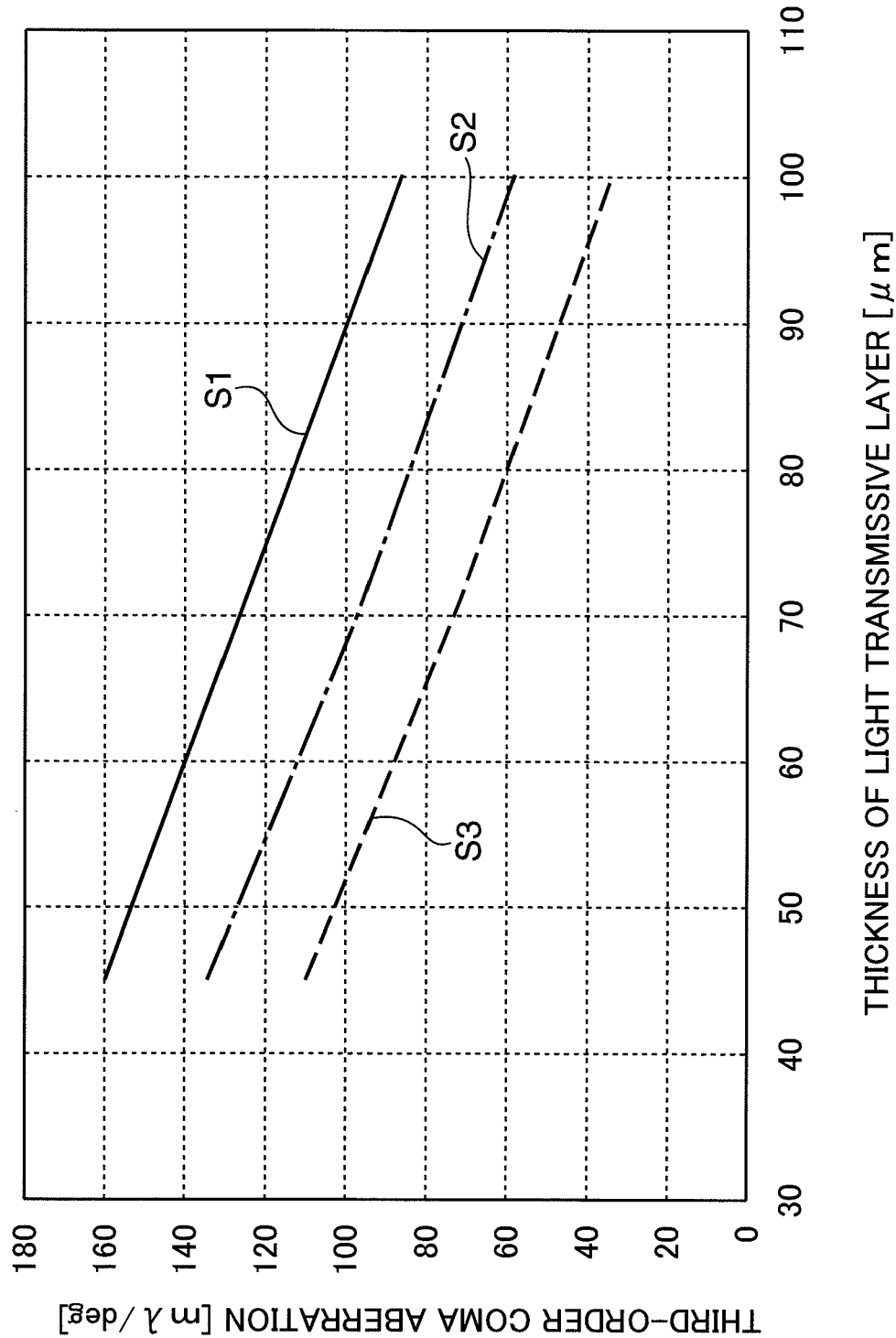

OPTICAL DISC DEVICE, OPTICAL HEAD, AND INFORMATION PROCESSING DEVICE

TECHNICAL FIELD

The present invention relates to an optical head for recording or reproducing information with respect to an information recording medium such as an optical disc having three or more information recording surfaces with light transmissive layers of different thicknesses, an optical disc device incorporated with the optical head, and an information processing device incorporated with the optical disc device.

BACKGROUND ART

As a blue-violet semiconductor laser has been put into practical use, a Blu-ray Disc (hereinafter, called as BD), as a high-density and large-capacity optical information recording medium (hereinafter, also called as an optical disc) and having substantially the same size as a CD (Compact Disc) and a DVD (Digital Versatile Disc), has been put into practical use. The BD is an optical disc having a light transmissive layer of a thickness of about 0.1 mm, and is adapted to record or reproduce information, using a blue-violet laser light source for emitting blue-violet light of about 400 nm wavelength, and an objective lens whose numerical aperture (NA) is about 0.85.

In recent years, forming a multilayer structure of information recording surfaces in a high-density optical disc such as a BD to be used with a blue-violet semiconductor laser has been conceived to further increase the capacity of the disc. In the case where plural layers of information recording surfaces are formed, information is recorded or reproduced with respect to each of the information recording surfaces. In this arrangement, since the thicknesses of the light transmissive layers are different from each other among the information recording surfaces, a third-order spherical aberration is generated on an information recording surface having a layer thickness different from an optimum light transmissive layer thickness (the thickness of a light transmissive layer which minimizes a third-order spherical aberration) with respect to the objective lens, depending on the distance from the light transmissive layer having the optimum layer thickness to the information recording surface.

For instance, in the case where the wavelength of light to be emitted from a semiconductor laser is 400 nm, the NA of the objective lens is 0.85, and the thickness of a light transmissive layer is displaced from the optimum light transmissive layer thickness by 10 μm, a third-order spherical aberration of about 100 mλ is generated. In view of the above, generally, an optical head for the optical disc having the above structure is provided with means for correcting a third-order spherical aberration.

For instance, patent literature 1 discloses an optical disc device, wherein a collimator lens is loaded on a collimator lens actuator, and the collimator lens disposed between a light source and an objective lens is moved in such a direction as to cancel a third-order spherical aberration resulting from a thickness difference in the light transmissive layer, whereby the divergent angle or the convergent angle of laser light to be incident into the objective lens is changed.

Further, many of the optical heads for a high-density optical disc and using short-wavelength laser light and an objective lens having a large numerical aperture are provided with means for correcting a third-order coma aberration resulting from a tilt (hereinafter, also called as a disc tilt) of the optical disc. In the optical heads, for instance, a method of tilting an objective lens loaded on an objective lens actuator, or a method using a liquid crystal element has been put into practical use.

In the case where a multilayer structure of information recording surfaces is formed, and a spherical aberration is corrected depending on the thickness of the respective light transmissive layers of an optical disc, it is well known that the aberration amount of third-order coma aberration resulting from a disc tilt, and the aberration amount of third-order coma aberration resulting from a tilt (hereinafter, also called as a lens tilt) of an objective lens are respectively changed depending on the thickness of the respective light transmissive layers of the optical disc.

For instance, patent literature 2 discloses an optical disc device, wherein the magnitude of a drive signal of coma aberration correcting means is changed depending on a ratio between the aberration amount of third-order coma aberration resulting from a disc tilt, and the aberration amount of third-order coma aberration resulting from a lens tilt. The conventional optical disc device disclosed in patent literature is described referring to FIG. 17.

FIG. 17 is a diagram showing a schematic arrangement of a conventional optical head. Referring to FIG. 17, an optical head 150 includes a light source 101, a diffraction grating 102, a polarized beam splitter 103, a front monitor sensor 104, a collimator lens 105, a beam expander 106, a quarter wavelength plate 107, a mirror 108, an objective lens actuator 109, an objective lens 110, a detection lens 112, and a light receiving element 113. An optical disc 111 has a first layer 111a formed on a side opposite to a light incident side of the optical disc 111, and a second layer 111b formed on the light incident side thereof.

Laser light emitted from the light source 101 is separated into three beams by the diffraction grating 102, transmitted through the polarized beam splitter 103, and incident into the collimator lens 105. A part of the laser light incident into the polarized beam splitter 103 is reflected on the polarized beam splitter 103, and incident into the front monitor sensor 104. The output of the light source 101 is controlled based on the output from the front monitor sensor 104.

The laser light incident into the collimator lens 105 is converted into substantially parallel light, and incident into the beam expander 106. A convex lens constituting the beam expander 106 is loaded on an actuator (not shown), and is movable in the optical axis direction to change the divergent angle or the convergent angle of laser light to be incident into the objective lens 110.

The laser light transmitted through the beam expander 106 is converted into circular polarized light while being transmitted through the quarter wavelength plate 107, reflected on the mirror 108, and incident into the objective lens 110. The laser light which is converged by the objective lens 110, and incident into an information recording surface of the optical disc 111 is reflected on the information recording surface of the optical disc 111, transmitted through the objective lens 110, and then reflected on the mirror 108. The laser light reflected on the mirror 108 is incident into the quarter wavelength plate 107, converted into linear polarized light whose polarization direction is rotated by 90 degrees with respect to the polarization direction on the outward path, and transmitted through the beam expander 106. The laser light transmitted through the beam expander 106 is converged by the collimator lens 105, and reflected on the polarized beam splitter 103. The laser light reflected on the polarized beam splitter 103 is incident into the light receiving element 113 through the detection lens 112, whereby an RF signal and a servo signal (a focus error signal and a tracking error signal) are detected.

A spherical aberration resulting from a thickness difference between the light transmissive layers of the first layer 111a and the second layer 111b of the optical disc 111 can be corrected by generating a spherical aberration having a polarity opposite to the polarity of the spherical aberration by converting the laser light to be incident into the objective lens 110 into divergent light or convergent light by the beam expander 106.

The objective lens actuator 109 drives the objective lens 110 in such a manner that a light spot follows an information track on the rotating optical disc 111, using a focus error signal and a tracking error signal. The objective lens actuator 109 is operable to tilt the objective lens 110 in the radial direction of the optical disc 111.

In the above arrangement, if a third-order spherical aberration is corrected with respect to the first layer 111a and the second layer 111b of the optical disc 111 depending on the thickness of the respective light transmissive layers, the aberration amount of third-order coma aberration resulting from a disc tilt, and the aberration amount of third-order coma aberration resulting from a lens tilt are different from each other. In view of the above, in the conventional optical head 150 disclosed in patent literature 2, a lens tilt amount is optimized by setting the lens tilt amount with respect to the second layer 111b to a predetermined amount smaller than the lens tilt amount with respect to the first layer 111a to thereby allow stable recording and reproducing operations at the time of correcting a third-order spherical aberration.

In the case where plural layers of information recording surfaces are formed, since the thicknesses of the light transmissive layers are different from each other among the information recording surfaces, a third-order spherical aberration is corrected by converting laser light to be incident into an objective lens into divergent light or convergent light.

In the above arrangement, the aberration amount of third-order coma aberration resulting from tilting an objective lens is different among the information recording surfaces. As the thickness of a light transmissive layer is decreased, the aberration amount of coma aberration resulting from tilting an objective lens by a predetermined angle is increased, and as the thickness of the light transmissive layer is increased, the aberration amount of coma aberration resulting from tilting the objective lens by a predetermined angle is decreased.

On the other hand, the aberration amount of coma aberration resulting from tilting an optical disc is increased in proportion to the thickness of a light transmissive layer. As the thickness of a light transmissive layer is decreased, the aberration amount of coma aberration resulting from tilting an optical disc by a predetermined angle is decreased, and as the thickness of a light transmissive layer is increased, the aberration amount of coma aberration resulting from tilting the optical disc by a predetermined angle is increased.

Accordingly, in the case where the thickness of a light transmissive layer is small, the tilt angle (the lens tilt angle) of an objective lens for correcting a coma aberration resulting from a disc tilt is small. However, as the thickness of a light transmissive layer is increased, the tilt angle (the lens tilt angle) of an objective lens for correcting a coma aberration is sharply increased. Further, astigmatism is generated in addition to a coma aberration, if the objective lens is tilted. A third-order astigmatism is sharply increased, as the lens tilt angle is increased, and an influence of the astigmatism becomes non-negligible.

On the other hand, as the thickness of a light transmissive layer is decreased, a third-order coma aberration resulting from a lens tilt is sharply increased. As a result, in the case where an objective lens is tilted over an allowable range due to e.g. a lens tilt control error at the time of correcting a third-order coma aberration, resonance of an objective lens actuator, or a like occasion, a residual third-order coma aberration becomes non-negligible.

As BDs, a single-layer disc having a single information recording surface with a light transmissive layer of 100 μM in thickness, and a dual layer disc having two information recording surfaces with light transmissive layers of 100 μm and 75 μm in thickness are available. It is necessary to secure a certain distance between information recording surfaces of an optical disc having the information recording surfaces in order to suppress an influence by reflection light reflected on an adjacent information recording surface e.g. crosstalk between information signals, or an offset of a servo signal resulting from stray light reflected on an adjacent information recording surface. In view of the above, it is required to increase the distance between an information recording surface having a largest light transmissive layer thickness, and an information recording surface having a smallest light transmissive layer thickness in a multilayer optical disc having three or more layers, as compared with a conventional dual layer BD.

The aforementioned problem becomes more serious in an optical head for recording or reproducing information with respect to a multilayer optical disc having three or more layers, as compared with an optical head for recording or reproducing information with respect to a conventional optical disc. However, the conventional optical head and the conventional optical disc device do not mention the above problem.

CITATION LIST

Patent Literature

Patent literature: JP Hei 11-259906A
Patent literature: JP 2007-133967A

SUMMARY OF INVENTION

In view of the above, an object of the invention is to provide an optical disc device, an optical head, and an information processing device that enable to record or reproduce information with respect to an information recording medium having three or more information recording surfaces with light transmissive layers of different thicknesses from each other.

An optical disc device according to an aspect of the invention is an optical disc device for recording or reproducing information with respect to an information recording medium having three or more information recording surfaces with light transmissive layers of different thicknesses from each other. The optical disc device includes a light source which emits laser light; an objective lens which converges the laser light emitted from the light source on a predetermined one of the information recording surfaces of the information recording medium; a spherical aberration correcting section which corrects a spherical aberration resulting from the thickness of the respective light transmissive layers of the information recording medium; a lens tilting section which tilts the objective lens in a radial direction of the information recording medium; and a tilt detecting section which detects a tilt of the information recording medium in the radial direction, wherein assuming that an aberration amount of third-order coma aberration resulting from tilting the information recording medium by a unit angle is CMD0 (unit: mλ/deg), an aberration amount of third-order coma aberration resulting from tilting the objective lens by a unit angle is CML0 (unit: mλ/deg), a tilt angle of the information recording medium detected by the tilt detecting section is θ, a coefficient is k0, and a tilt angle of the objective lens by the objective lens tilting section is α0 in converging the laser light on an information recording surface L0 having a largest light transmissive layer thickness out of the information recording surfaces of the information recording medium, the lens tilting section tilts the objective lens in such a manner that the tilt angle α0 of the objective lens satisfies the mathematical expression (1).

$$\alpha0=\theta \times k0 \times CMD0/CML0, \text{ where } 0.5<k0<0.9 \quad (1)$$

In the above arrangement, the information recording medium has three or more information recording surfaces with light transmissive layers of different thicknesses from each other. The light source emits laser light, and the objective lens converges the laser light emitted from the light source on a predetermined one of the information recording surfaces of the information recording medium. The spherical aberration correcting section corrects a spherical aberration resulting from the thickness of the respective light transmissive layers of the information recording medium, the lens tilting section tilts the objective lens in a radial direction of the information recording medium, and the tilt detecting section detects a tilt of the information recording medium in the radial direction. Further, the lens tilting section tilts the objective lens in such a manner that the tilt angle α0 of the objective lens satisfies the mathematical expression (1).

According to the invention, the objective lens is tilted in such a manner that the total wavefront aberration is optimized in converging laser light on the information recording surface L0 having a largest light transmissive layer thickness. Accordingly, information can be advantageously recorded or reproduced with respect to the information recording medium having three or more information recording surfaces with light transmissive layers of different thicknesses from each other.

These and other objects, features and advantages of the present invention will become more apparent upon reading the following detailed description along with the accompanying drawings.

BRIEF DESCRIPTION OF DRAWINGS

FIG. 7 is a diagram showing a relation between a third-order coma aberration amount resulting from a lens tilt of 1.0 deg and a thickness of a light transmissive layer with respect to three kinds of objective lenses.

DESCRIPTION OF EMBODIMENTS

In the following, embodiments of the invention are described referring to the accompanying drawings. The following embodiments are merely examples embodying the invention, and do not limit the technical scope of the invention.

First Embodiment

Figure 1:
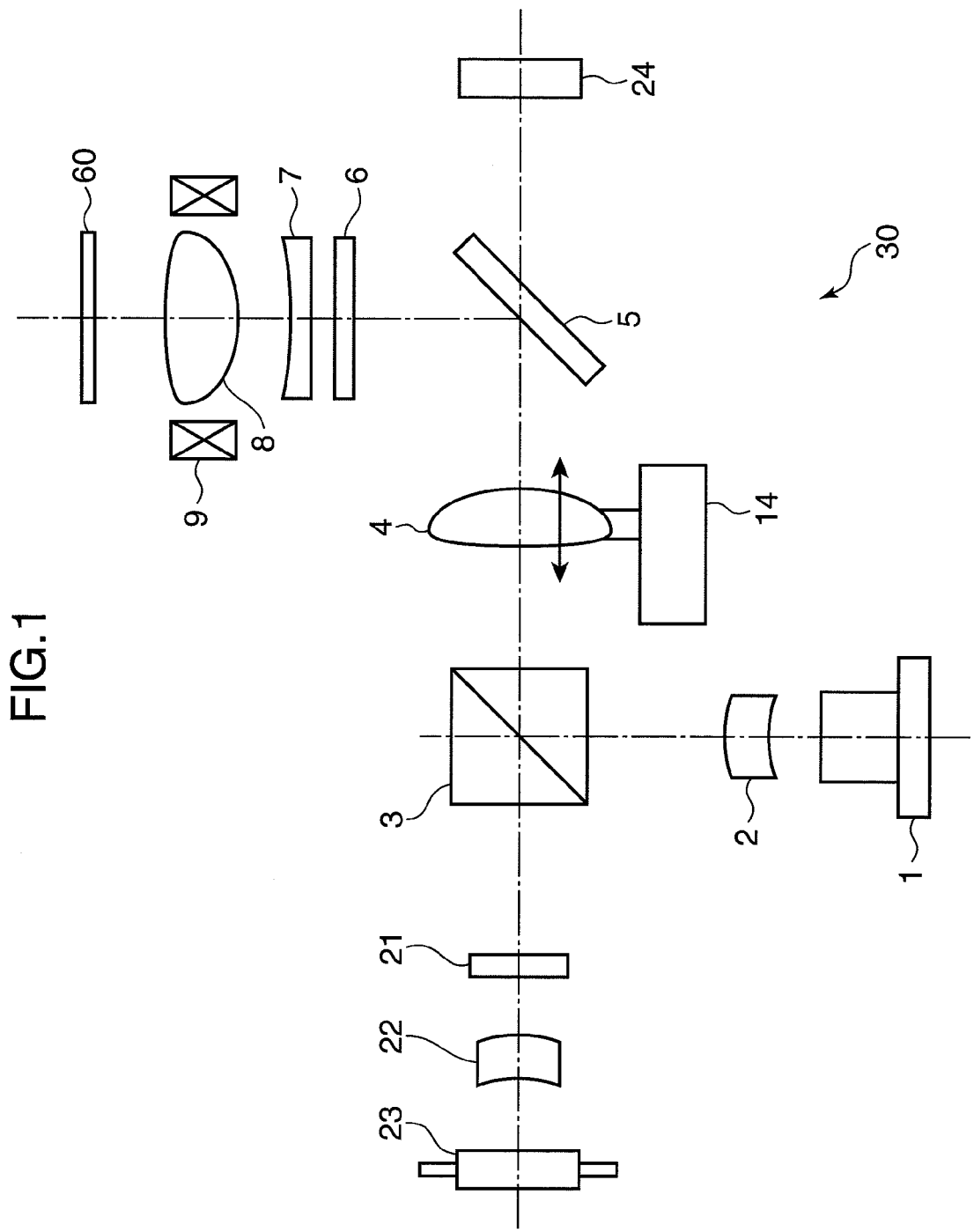
FIG. 1 is a diagram showing a schematic arrangement of an optical head in the first embodiment of the invention.
Figure 2:
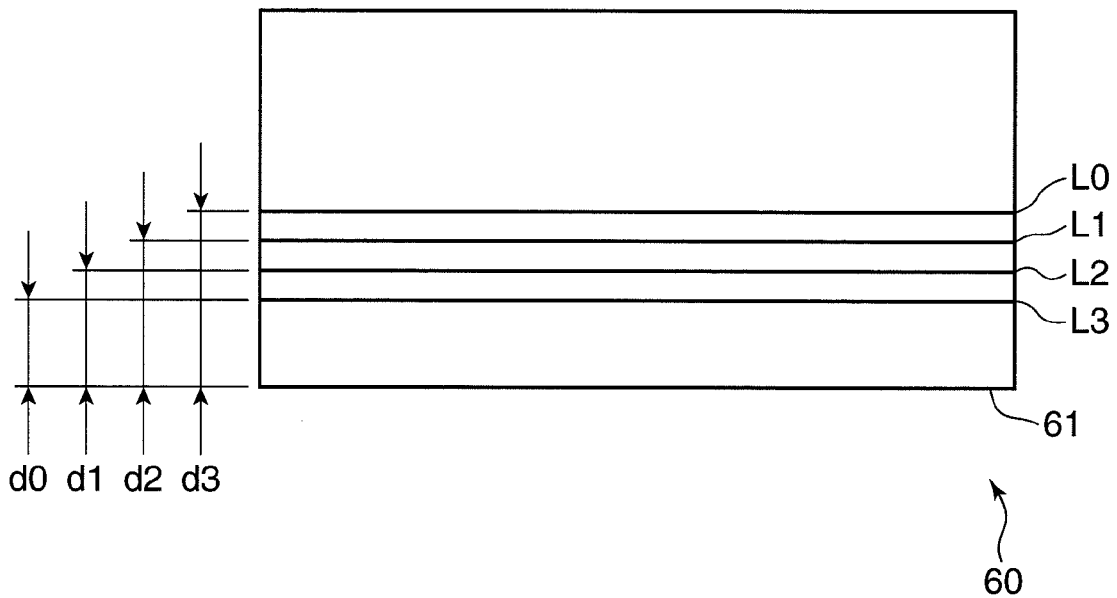
FIG. 2 is a diagram showing a schematic arrangement of a multilayer optical disc in the first embodiment of the invention.

FIG. 1 is a diagram is a diagram showing a schematic arrangement of an optical head in the first embodiment of the invention. FIG. 2 is a diagram showing a schematic arrangement of a multilayer optical disc in the first embodiment of the invention.

Referring to FIG. 1, an optical head 30 includes a blue-violet laser light source 1 for emitting blue-violet laser light, a relay lens 2, a polarized beam splitter 3, a collimator lens 4, a mirror 5, a quarter wavelength plate 6, a diffraction lens 7, an objective lens 8, an objective lens actuator 9, a collimator lens actuator 14, a detection hologram 21, a detection lens 22, a light receiving element 23, and a front monitor sensor 24.

As shown in FIG. 2, a multilayer optical disc 60 has four information recording surfaces L0, L1, L2, and L3. The thickness d3 of a light transmissive layer of the information recording surface L0 is set to e.g. 100 μm, the thickness d2 of a light transmissive layer of the information recording surface L1 is set to e.g. 83 μm, the thickness d1 of a light transmissive layer of the information recording surface L2 is set to e.g. 69 μm, and the thickness d0 of a light transmissive layer of the information recording surface L3 is set to e.g. 55 μm.

In the specification, a light transmissive layer represents a layer formed between an information recording surface and a light incident surface 61. Accordingly, the thickness of a light transmissive layer of an information recording surface indicates a distance from the information recording surface to the light incident surface 61.

Next, an operation to be performed by the optical head 30 for recording or reproducing information with respect to the multilayer optical disc 60 is described. Blue-violet laser light of about 405 nm wavelength which is emitted from the blue-violet laser light source 1 is converted into divergent light having a different NA through the relay lens 2, and incident into the polarized beam splitter 3 as S-polarized light. The laser light reflected on the polarized beam splitter 3 is converted into substantially parallel light by the collimator lens 4, and bent in the direction toward the quarter wavelength plate 6 by the mirror 5 while being reflected on the mirror 5. A part of the laser light incident into the mirror 5 is transmitted through the mirror 5 and incident into the front monitor sensor 24. Then, the output of the blue-violet laser light source 1 is controlled based on the output from the front monitor sensor 24.

On the other hand, the laser light reflected on the mirror 5 is converted into circular polarized light by the quarter wavelength plate 6, and transmitted through the diffraction lens 7. The laser light transmitted through the diffraction lens 7 is converged on one of the information recording surfaces L0 through L3 of the multilayer optical disc 60, as a light spot, by the objective lens 8.

The blue-violet laser light reflected on a predetermined information recording surface of the multilayer optical disc 60 is transmitted through the objective lens 8 and the diffraction lens 7, converted into linear polarized light in a polarization direction different from the outward path by the quarter wavelength plate 6, and then reflected on the mirror 5. The laser light reflected on the mirror 5 is transmitted through the collimator lens 4, and incident into the polarized beam splitter 3 as P-polarized light. The laser light transmitted through the polarized beam splitter 3 is guided to the light receiving element 23 through the detection hologram 21 and the detection lens 22. The laser light detected by the light receiving element 23 is subjected to photoelectric conversion. A signal generated by the photoelectric conversion is computed by a control section which is described later, and a focus error signal for use in following plane displacement of the multilayer optical disc 60, and a tracking error signal for use in following decentering of the multilayer optical disc 60 are generated.

Next, detection of a focus error signal and detection of a tracking error signal in the optical head of this embodiment are described.

A focus error signal for use in recording or reproducing information with respect to the multilayer optical disc 60 is generated, using a so-called astigmatism method, wherein a light collecting spot imparted with astigmatism by the detection lens 22 is detected by a four-division light receiving pattern in the light receiving element 23.

On the other hand, a tracking error signal is generated by detecting zero-th order light and ±first-order diffraction light generated while transmitting through the detection hologram 21 on a predetermined light receiving area of the light receiving element 23. The above arrangement enables to suppress a variation in a tracking error signal resulting from a change in the position, the width, and the depth of an information track groove to be formed in the multilayer optical disc 60; and a variation in a tracking error signal resulting from a change in the reflectance due to information recording in an information track. Further, the above arrangement enables to avoid a likelihood that unwanted light (stray light) reflected on an information recording surface other than a targeted information recording surface to be recorded or reproduced may be incident into the light receiving area for detecting a tracking error signal.

Figure 3:
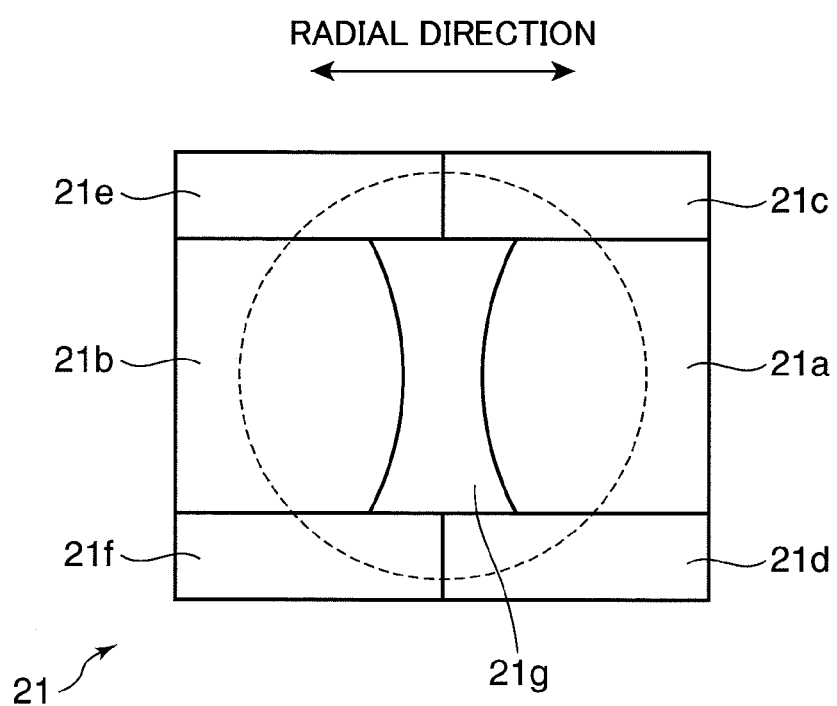
FIG. 3 is a diagram schematically showing an example of a light flux dividing pattern on a detection hologram in the first embodiment of the invention.

FIG. 3 is a diagram schematically showing an example of a light flux dividing pattern on the detection hologram 21 in the first embodiment of the invention. The curved line in FIG. 3 indicates a light flux diameter, on the detection hologram 21, of laser light reflected on an information recording surface of the multilayer optical disc 60. The detection hologram 21 has seven kinds of areas 21a, 21b, 21c, 21d, 21e, 21f, and 21g, and laser light incident into each of the areas 21a through 21g is divided into zero-th order diffraction light and ±first-order diffraction light. A tracking error signal TE is obtained by a computation expressed by the following equation (2), using electrical signals Ia, Ib, Ic, Id, Ie, If, and Ig derived from the ±first-order diffraction light diffracted by the respective areas 21a through 21g, depending on the respective light receiving amounts by the light receiving element 23.

$$TE=(Ia-Ib)-k(Ic+Id-Ie-If) \quad (2)$$

Methods for detecting a focus error signal and a tracking error signal are not limited to the aforementioned detection methods. Alternatively, a tracking error signal may be detected by a differential push-pull method (DPP method) using a main beam and a sub beam generated by a diffraction grating.

Figure 4:
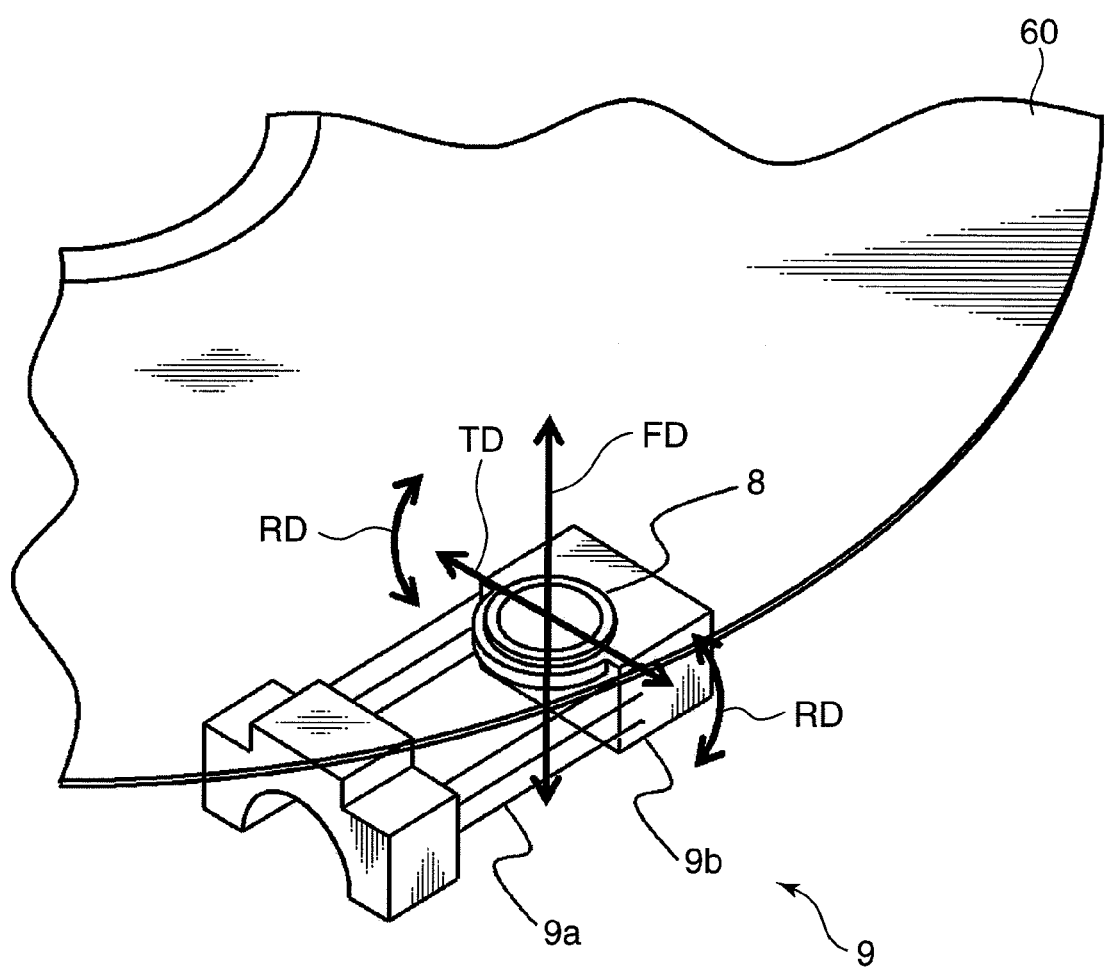
FIG. 4 is a diagram schematically showing an arrangement of an objective lens actuator in the first embodiment of the invention.

Next, an objective lens actuator in this embodiment is described. FIG. 4 is a diagram schematically showing an arrangement of an objective lens actuator in the first embodiment of the invention.

The objective lens actuator 9 drives the objective lens 8 in two axes directions in such a manner that a light spot follows an information track of the rotating multilayer optical disc 60, using a focus error signal and a tracking error signal.

As shown in FIG. 4, an objective lens holder 9b (a movable portion) for holding the objective lens 8 is supported by suspension wires 9a. The objective lens actuator 9 drives the objective lens 8 in a focus direction FD and a tracking direction TD, using a focus error signal and a tracking error signal so that a light spot follows an information track of the rotating multilayer optical disc 60.

Further, the objective lens actuator 9 is operable to tilt the objective lens 8 in the radiation direction RD of the multilayer optical disc 60, in addition to displacing the objective lens 8 in the focus direction FD and the tracking direction TD.

Next, the collimator lens actuator in the first embodiment is described. The collimator lens 4 is movable in the optical axis direction of the collimator lens 4 by the collimator lens actuator 14.

Figure 5:
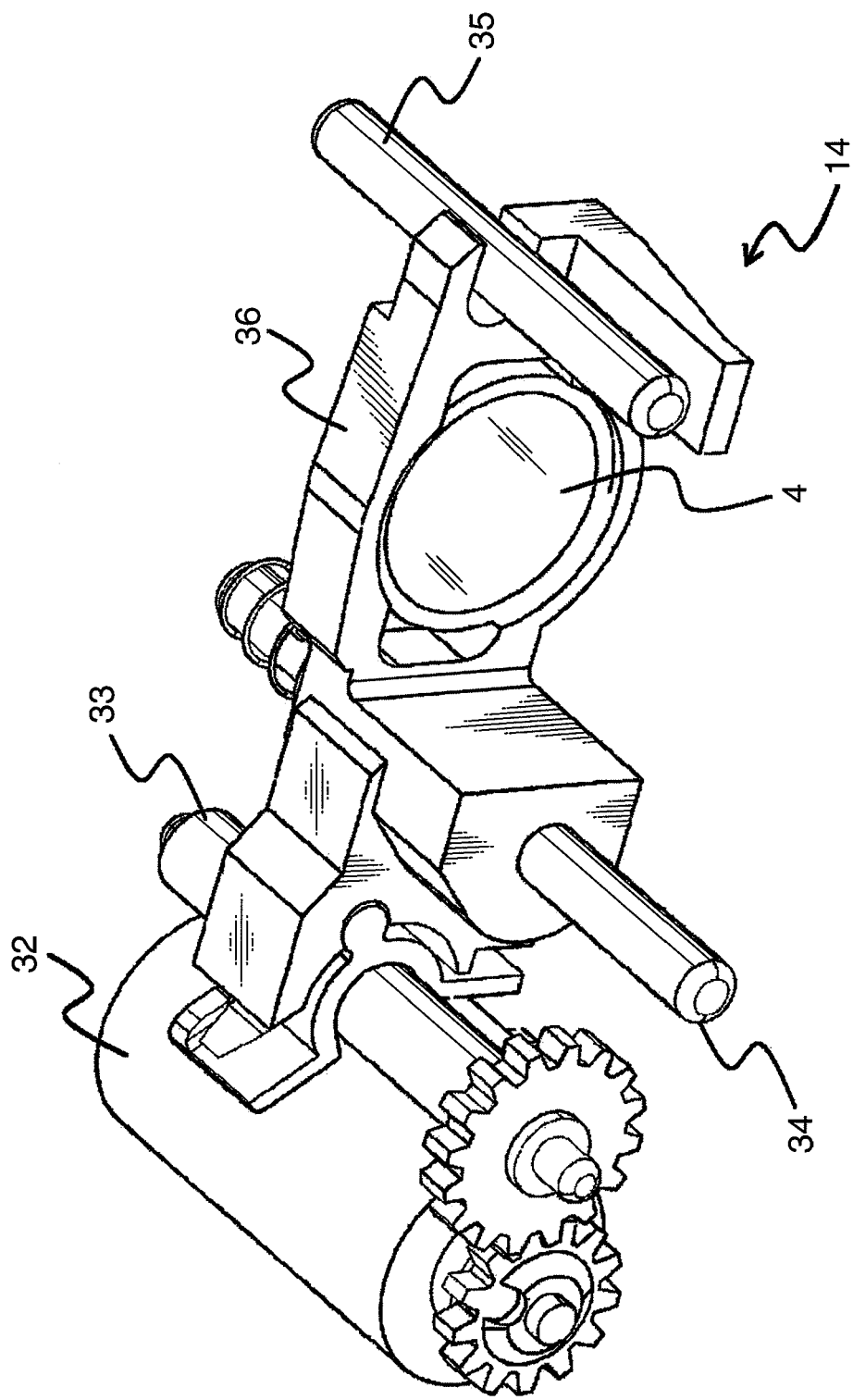
FIG. 5 is a schematic diagram showing a schematic arrangement of a collimator lens actuator in the first embodiment of the invention.

FIG. 5 is a schematic diagram showing a schematic arrangement of the collimator lens actuator 14 in the first embodiment of the invention. Referring to FIG. 5, the collimator lens actuator 14 has a stepping motor 32, a screw shaft 33, a main shaft 34, an auxiliary shaft 35, and a lens holder 36. By driving the stepping motor 32 to rotate the screw shaft 33, the lens holder 36 holding the collimator lens 4 is moved in the optical axis direction of the collimator lens 4 along the main shaft 34 and the auxiliary shaft 35.

Figures 6A, 6B, 6C:
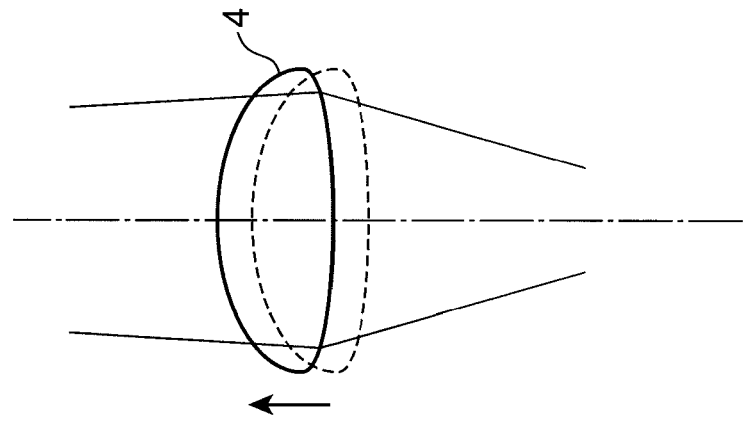
FIG. 6A is a diagram showing emission light, in the case where a collimator lens is set to a reference position.
FIG. 6B is a diagram showing emission light, in the case where the collimator lens is moved toward a light source.
FIG. 6C is a diagram showing emission light, in the case where the collimator lens is moved toward an objective lens.

FIG. 6A is a diagram showing emission light, in the case where the collimator lens is set to a reference position. FIG. 6B is a diagram showing emission light, in the case where the collimator lens is moved toward the light source. FIG. 6C is a diagram showing emission light, in the case where the collimator lens is moved toward the objective lens.

As shown in FIG. 6A, in the case where the collimator lens 4 is set to the reference position, emission light from the collimator lens 4 becomes substantially parallel light. On the other hand, as shown in FIG. 6B, in the case where the collimator lens 4 is moved from the reference position toward the light source, emission light from the collimator lens 4 becomes divergent light, and a third-order spherical aberration resulting from an increase in the light transmissive layer thickness of the multilayer optical disc 60 can be corrected.

On the other hand, as shown in FIG. 6C, by moving the collimator lens 4 from the reference position toward the objective lens, emission light from the collimator lens 4 becomes convergent light, and a spherical aberration resulting from a decrease in the light transmissive layer thickness of the multilayer optical disc 60 can be corrected. In other words, a third-order spherical aberration of the multilayer optical disc 60 formed with plural information recording surfaces can be corrected by moving the collimator lens 4 depending on the thickness of a light transmissive layer of each of the information recording surfaces.

The arrangement of the collimator lens actuator 14 for moving the collimator lens 4 in the optical axis direction is not limited to the arrangement incorporated with the stepping motor 32, as shown in FIG. 5, but may include any arrangement incorporated with e.g. an actuator operable by driving a magnetic circuit or a piezoelectric element. The arrangement incorporated with the stepping motor 32, as shown in FIG. 5, is advantageous in simplifying a disc drive system, because there is no need of monitoring the position of the collimator lens 4 in the optical axis direction. On the other hand, since a driving portion of an actuator operable by driving a magnetic circuit or a piezoelectric element is small, the arrangement incorporated with the above actuator is advantageous in miniaturizing the optical head.

Next, an objective lens in the first embodiment is described.

In the optical head 30 of the first embodiment, by correcting a spherical aberration depending on the thickness of a light transmissive layer, the aberration amount of third-order coma aberration resulting from tilting the objective lens 8 by a predetermined angle is changed, and the aberration amount of third-order coma aberration resulting from an increase in the light transmissive layer thickness is decreased.

On the other hand, the aberration amount of coma aberration resulting from tilting an optical disc by a predetermined angle is increased in proportion to the thickness of a light transmissive layer.

FIG. 7 is a diagram showing a relation between an aberration amount of third-order coma aberration resulting from tilting an objective lens by 1.0 deg, and a thickness of a light transmissive layer with respect to three kinds of objective lenses S1, S2, and S3. The three kinds of the objective lenses S1, S2, and S3 are designed in such a manner that the aberration amount of third-order coma aberration resulting from tilting an objective lens by 1.0 deg is changed among the objective lenses S1 through S3, in the case where the thickness of a light transmissive layer is set to 80 µm. Referring to FIG. 7, the axis of abscissas represents a thickness of a light transmissive layer, and the axis of ordinate represents an aberration amount of third-order coma aberration resulting from tilting an objective lens by 1.0 deg (when the lens tilt is 1.0 deg).

The other design conditions of the objective lenses S1 through S3 are as follows. Specifically, the design wavelength is set to 405 nm, the design light transmissive layer thickness is set to 80 µm, the focal length is set to 1.3 mm, the numerical aperture is set to 0.855, the working distance is set to 0.3 mm, and the glass material is VC79.

Further, a lens system is designed in such a manner that the aberration amount of third-order coma aberration, in the case where the thickness of a light transmissive layer is set to 80 µm, the lens tilt is set to 1.0 deg, and the objective lens S1 is used, becomes 113 mλ. Another lens system is designed in such a manner that the aberration amount of third-order coma aberration under the same condition as described above except that the objective lens S2 is used, becomes 84 mλ, and yet another lens system is designed in such a manner that the aberration amount of third-order coma aberration under the same condition as described above except that the objective lens S3 is used, becomes 61 mλ.

As is obvious from FIG. 7, a third-order coma aberration resulting from a lens tilt is decreased, as the thickness of a light transmissive layer is increased, and is linearly changed with respect to the thickness of a light transmissive layer.

For instance, in the case where the objective lens S1 is used, the aberration amount of third-order coma aberration resulting from a lens tilt of 1.0 deg is 146 mλ, in the case where the thickness of a light transmissive layer is set to 55 µm; is 113 mλ, in the case where the thickness of a light transmissive layer is set to 80 µm; and is 87 mλ, in the case where the thickness of a light transmissive layer is set to 100 µm.

Further, as is obvious from FIG. 7, since a gradient of each of the graphs using the objective lenses S1 through S3 is constant, a change in the aberration amount of third-order coma aberration resulting from a change in the thickness of a light transmissive layer by a predetermined amount is constant, without depending on the design specifications of an objective lens.

Figure 8:
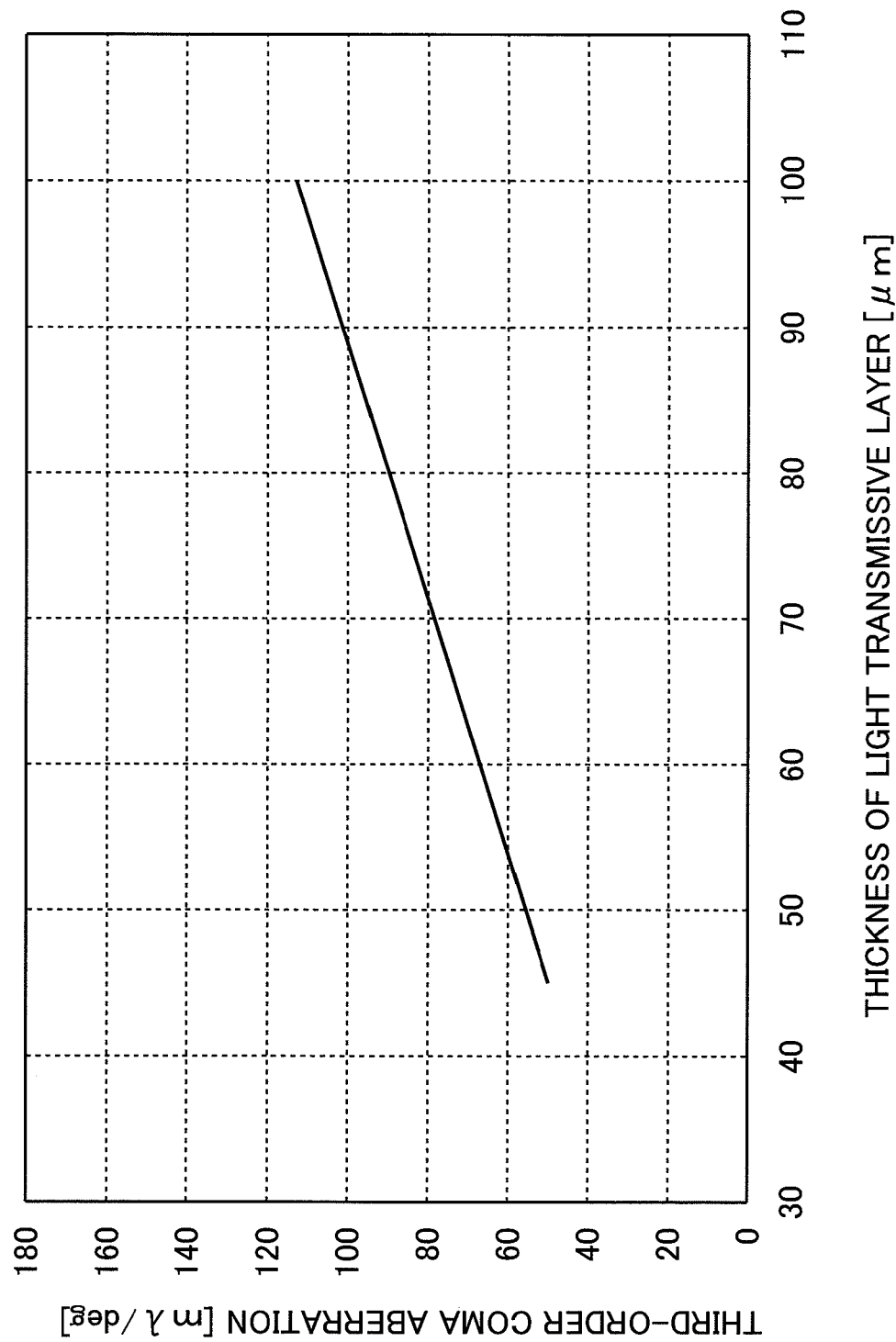
FIG. 8 is a diagram showing a relation between an aberration amount of third-order coma aberration resulting from tilting a multilayer optical disc by 1.0 deg, and a thickness of a light transmissive layer.

FIG. 8 is a diagram showing a relation between an aberration amount of third-order coma aberration resulting from tilting the multilayer optical disc 60 by 1.0 deg, i.e. a disc tilt of 1.0 deg, and a thickness of a light transmissive layer. Referring to FIG. 8, the axis of abscissas represents a thickness of a light transmissive layer, and the axis of ordinate represents an aberration amount of third-order coma aberration resulting from tilting the multilayer optical disc 60 by 1.0 deg. The aberration amount of third-order coma aberration resulting from a disc tilt is uniquely determined by the numerical aperture of an objective lens, and is increased in proportion to the thickness of a light transmissive layer. Accordingly, there is no difference in the aberration amount of third-order coma aberration among the objective lenses S1 through S3.

As is obvious from FIGS. 7 and 8, a lens tilt amount required for correcting a third-order coma aberration resulting from tilting the multilayer optical disc 60 by a predetermined angle is sharply increased, as the thickness of a light transmissive layer is increased. For instance, in the case where the thickness of a light transmissive layer is 100 µm, it is required to tilt the objective lens S1 by 0.26 deg, tilt the objective lens S2 by 0.38 deg, or tilt the objective lens S3 by 0.65 deg to correct a third-order coma aberration resulting from tilting the multilayer optical disc 60 by 0.2 deg.

Figure 9:
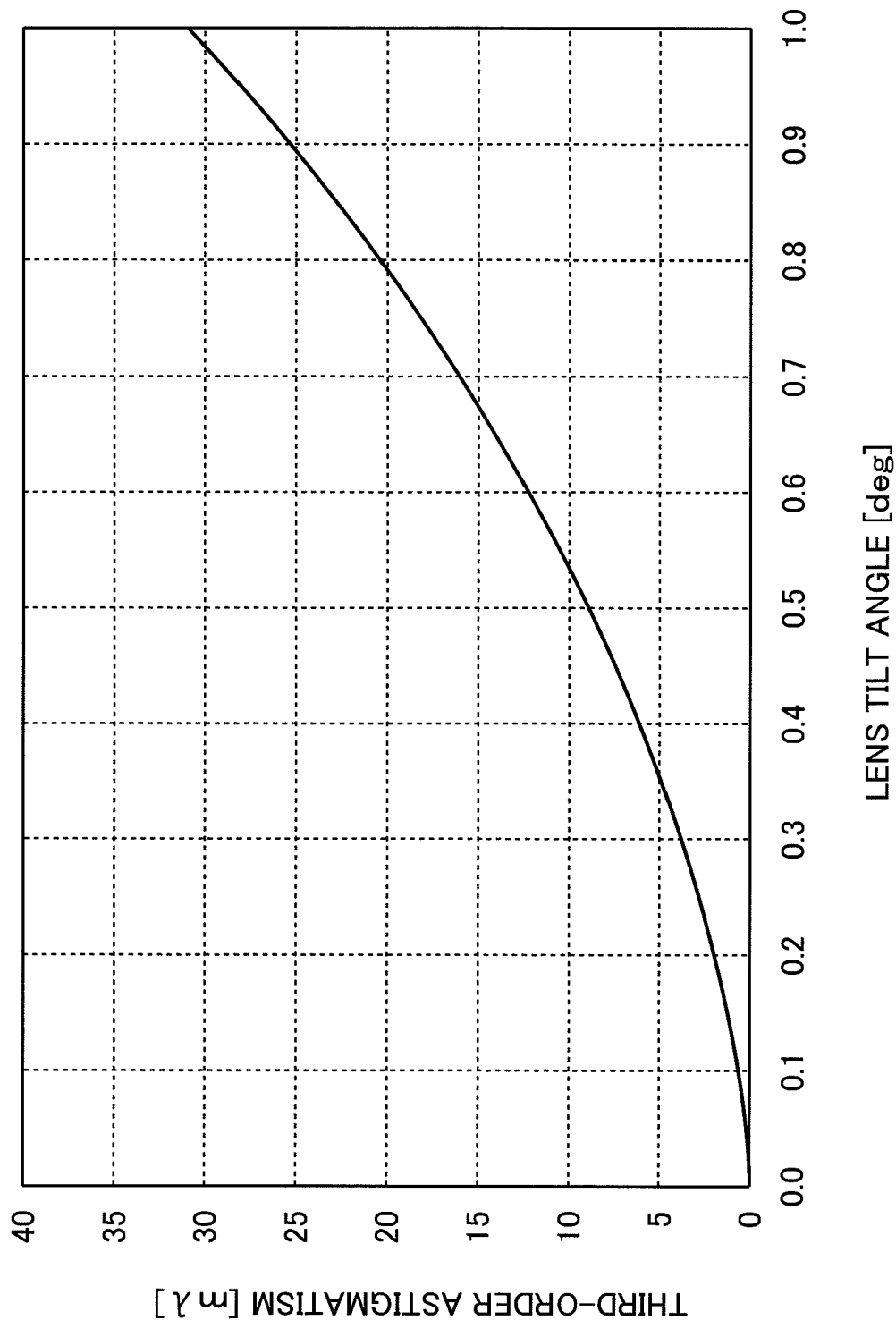
FIG. 9 is a diagram showing a relation between a third-order astigmatism amount resulting from a lens tilt, and a lens tilt angle.

In the case where an objective lens is tilted, a third-order astigmatism is generated, in addition to a third-order coma aberration. A third-order astigmatism resulting from a lens tilt is substantially uniquely determined by the thickness of a lens which is determined by a focal length and an working distance, and a difference in the third-order astigmatism resulting from a thickness of a light transmissive layer is significantly small. FIG. 9 is a diagram showing a relation between an aberration amount of third-order astigmatism resulting from a lens tilt, and a lens tilt angle of an objective lens satisfying the above design condition. Referring to FIG. 9, the axis of abscissas represents a lens tilt angle, and the axis of ordinate represents an aberration amount of third-order astigmatism. As is obvious from FIG. 9, a third-order astigmatism is sharply increased, as the lens tilt angle is increased. For instance, if the lens tilt angle exceeds 0.5 deg, a third-order astigmatism reaches 10 mλ, and an influence of the third-order astigmatism becomes non-negligible.

A third-order coma aberration resulting from a tilt of the multilayer optical disc 60 is increased in proportion to the thickness of a light transmissive layer. Accordingly, for instance, in the case where a tilt of the multilayer optical disc 60 greatly differs between an inner circumference of the disc 60 and an outer circumference of the disc 60, or in the case where a flexure of the multilayer optical disc 60 is greatly changed resulting from a change in the ambient temperature, a residual amount of coma aberration after correcting the third-order coma aberration is increased, as the thickness of a light transmissive layer is increased.

On the other hand, in the case where the thickness of a light transmissive layer is small, it is possible to set a tilt amount (a lens tilt amount) of an objective lens for correcting a third-order coma aberration resulting from tilting the multilayer optical disc 60 by a predetermined angle, to a small amount. For instance, in the case where the thickness of a light transmissive layer is 55 μm, by tilting the objective lens S1 by 0.08 deg, tilting the objective lens S2 by 0.10 deg, or tilting the objective lens S3 by 0.13 deg, it is possible to correct a third-order coma aberration resulting from tilting the multilayer optical disc 60 by 0.2 deg.

However, a residual amount of third-order coma aberration is exceedingly increased, in the case where an objective lens is tilted over an allowable range due to a lens tilt control error at the time of correcting a third-order coma aberration, resonance of the objective lens actuator, or a like cause. For instance, if a control error of ±0.2 deg with respect to a predetermined lens tilt angle is generated, a third-order coma aberration of 29 mλ is generated in using the objective lens S1, a third-order coma aberration of 24 mλ is generated in using the objective lens S2, and a third-order coma aberration of 19 mλ is generated in using the objective lens S3.

As described above, a factor which worsens an aberration is different among the information recording surfaces of the multilayer optical disc 60 having the three or more information recording surfaces, and whose distance between an information recording surface having a largest light transmissive layer thickness, and an information recording surface having a smallest light transmissive layer thickness is large. Accordingly, it is required to design an objective lens, considering a factor which worsens an aberration, in such a manner that the aberration amount of third-order coma aberration resulting from a lens tilt is set to a proper value.

Figure 10:
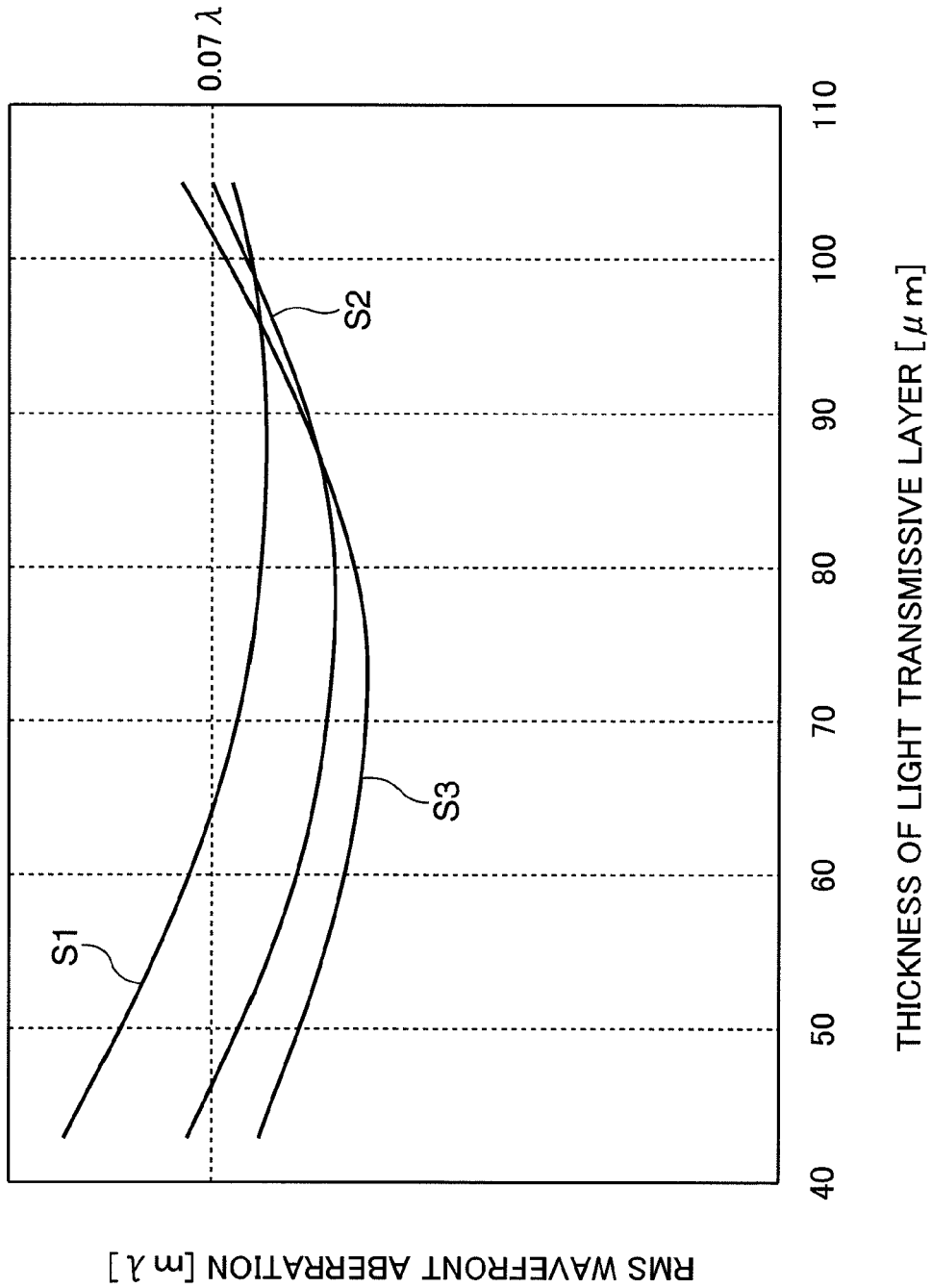
FIG. 10 is a diagram showing a relation between a worst value of an RMS wavefront aberration and a thickness of a light transmissive layer with respect to three kinds of objective lenses.

FIG. 10 is a diagram showing a relation between a worst value of an RMS (Root Mean Square) wavefront aberration and a thickness of a light transmissive layer with respect to three kinds of objective lenses. The graph shown in FIG. 10 is an estimation result on a worst value of a total wavefront aberration (RMS wavefront aberration) with respect to each of the three kinds of the objective lenses S1 through S3 shown in FIG. 7, considering a third-order astigmatism generated at the time of correcting a third-order coma aberration, residual third-order coma aberration resulting from e.g. control error at the time of correcting a third-order coma aberration, residual third-order coma aberration resulting from a change in the tilt of the multilayer optical disc, and the like.

The objective lens 8 in the first embodiment is designed to have the same characteristic as the characteristic of the objective lens S2 shown in FIG. 10. The above arrangement enables to keep an RMS wavefront aberration from exceeding 0.07λ, which is Marechal criterion, as far as the thicknesses of light transmissive layers of the information recording surfaces L0 through L3 lie in a range of from 55±5 to 100±5 μm (including an error of a light transmissive layer thickness). Marechal criterion indicates a limit point of an allowable wavefront aberration in an imaging optical system. If the wavefront aberration of the entirety of an imaging optical system does not exceed Marechal criterion, the central intensity of the imaging optical system becomes equal to or larger than 80%, as compared with an aberration-free condition. Thus, information can be recorded or reproduced with respect to an optical disc without no or less problem.

As described above, the aberration amount of third-order coma aberration resulting from a lens tilt is decreased, as the thickness of a light transmissive layer is increased, and is linearly changed with respect to the thickness of a light transmissive layer. Further, a change in the aberration amount of third-order coma aberration resulting from a change in the thickness of a light transmissive layer by a predetermined amount is constant without depending on the design specifications of an objective lens.

In other words, assuming that the aberration amount of third-order coma aberration resulting from tilting an objective lens by a unit angle in converging laser light on the information recording surface L0 having a largest light transmissive layer thickness is CML0 (unit: mλ/deg), and the aberration amount of third-order coma aberration resulting from tilting the objective lens by a unit angle in converging laser light on the information recording surface L3 having a smallest light transmissive layer thickness is CML3 (unit: mλ/deg), the third-order coma aberration performance of the objective lens can be uniquely determined by CML3/CML0.

The objective lens 8 in the embodiment is designed to satisfy a requirement: CML3/CML0=2.02. The invention is not specifically limited to the above. The objective lens 8 may satisfy a requirement: 2.5≧CML3/CML0≧1.5. Satisfying the above requirement enables to advantageously record or reproduce information with respect to each of the information recording surfaces of the multilayer optical disc 60 in the first embodiment, wherein the information recording surface L0 has a light transmissive layer thickness of 100±5 μm, and the information recording surface L3 has a light transmissive layer thickness of 55±5 μm.

In the case where 2.5<CML3/CML0, the aberration amount of third-order coma aberration resulting from tilting an objective lens by a unit angle in converging laser light on the information recording surface L0 having a largest light transmissive layer thickness is unduly decreased, with the result that the lens tilt angle at the time of correcting a third-order coma aberration is unduly increased. In this occasion, an influence of a third-order astigmatism resulting from a lens tilt becomes non-negligible, and it is impossible to sufficiently reduce a total wavefront aberration (RMS wavefront aberration).

On the other hand, in the case where 1.5>CML3/CML0, the aberration amount of third-order coma aberration resulting from tilting an objective lens by a unit angle in converging laser light on the information recording surface L3 having a smallest light transmissive layer thickness is unduly increased. In this occasion, if a lens tilt occurs resulting from e.g. resonance of an objective lens actuator, information recording performance or information reproducing performance may be considerably deteriorated.

In view of the above, preferably, the objective lens 8 may satisfy the requirement: $2.5 \geq CML3/CML0 \geq 1.5$.

In view of a point that the thickness of a light transmissive layer of a BD is maximally 100 μm, it is preferable to set the largest light transmissive layer thickness in a multilayer optical disc having three or more information recording surfaces to 100 μm, and set the light transmissive layer thicknesses of the other information recording surfaces to a value smaller than 100 μm. By forming the multilayer optical disc with three or more information recording surfaces having the above-described structure, the multilayer optical disc is easily compatible with a conventional BD. The objective lens 8 in the first embodiment enables to keep an RMS wavefront aberration from exceeding Marechal criterion, as far as the light transmissive layer thickness is in the range of from 75±5 to 100±5 μm. Accordingly, the optical head incorporated with the objective lens 8 enables to advantageously record or reproduce information with respect to the conventional BD, as well as the multilayer optical disc.

The objective lens S1 has substantially the same design specifications as that of the objective lens which is used in the conventional optical disc device disclosed in patent literature 2, and satisfies a sine condition with respect to a light transmissive layer thickness of 100 μm. As is obvious from FIG. 10, use of the objective lens S1 enables to keep an RMS wavefront aberration from exceeding Marechal criterion, as far as the light transmissive layer thickness lies in the range of from 75±5 to 100±5 μm. However, since CML3/CML0=1.38, it is obvious that the objective lens S1 is not suitable to record or reproduce information with respect to the multilayer optical disc 60 in the first embodiment.

Next, a method for correcting a third-order coma aberration in an optical disc device of the first embodiment is described in detail.

Generally, in loading an objective lens in an optical head, a tilt of the objective lens in two axes directions is adjusted on an optical base (not shown) in such a manner that a third-order coma aberration of the objective lens, and a third-order coma aberration of an optical element other than the objective lens are corrected.

For instance, a wavefront aberration of a light spot to be converged by transmitting laser light to be emitted from an objective lens through a reference disc having a predetermined thickness (generally, a design optical light transmissive layer thickness) is measured, and a tilt of the objective lens in two axes directions is adjusted to minimize a third-order coma aberration. Alternatively, the diameter of a light spot to be converged by transmitting laser light through a reference disc is measured, and a tilt of an objective lens in two axes directions is adjusted to minimize the light spot diameter.

As shown in FIG. 4, the objective lens 8 is adhesively fixed to the objective lens holder 9b of the objective lens actuator 9. Accordingly, it is a general practice to adjust a tilt of the objective lens 8 in two axes directions along with the objective lens actuator 9, and adhesively fix the objective lens actuator 9 on the optical base, after the adjustment of a tilt of the objective lens 8 in two axes directions.

However, there is a case that there remains a third-order coma aberration, even after the adjustment of a tilt of the objective lens actuator 9 in two axes directions, because of a measurement error of a wavefront aberration, a measurement error of a light spot diameter, a displacement in adhesive fixation after the adjustment of a tilt in two axes directions, or a like cause. In view of the above, the optical disc device in the first embodiment is constructed to learn an optimum tilt angle of the objective lens 8, after adhesive fixation of the objective lens actuator 9.

Figure 11:
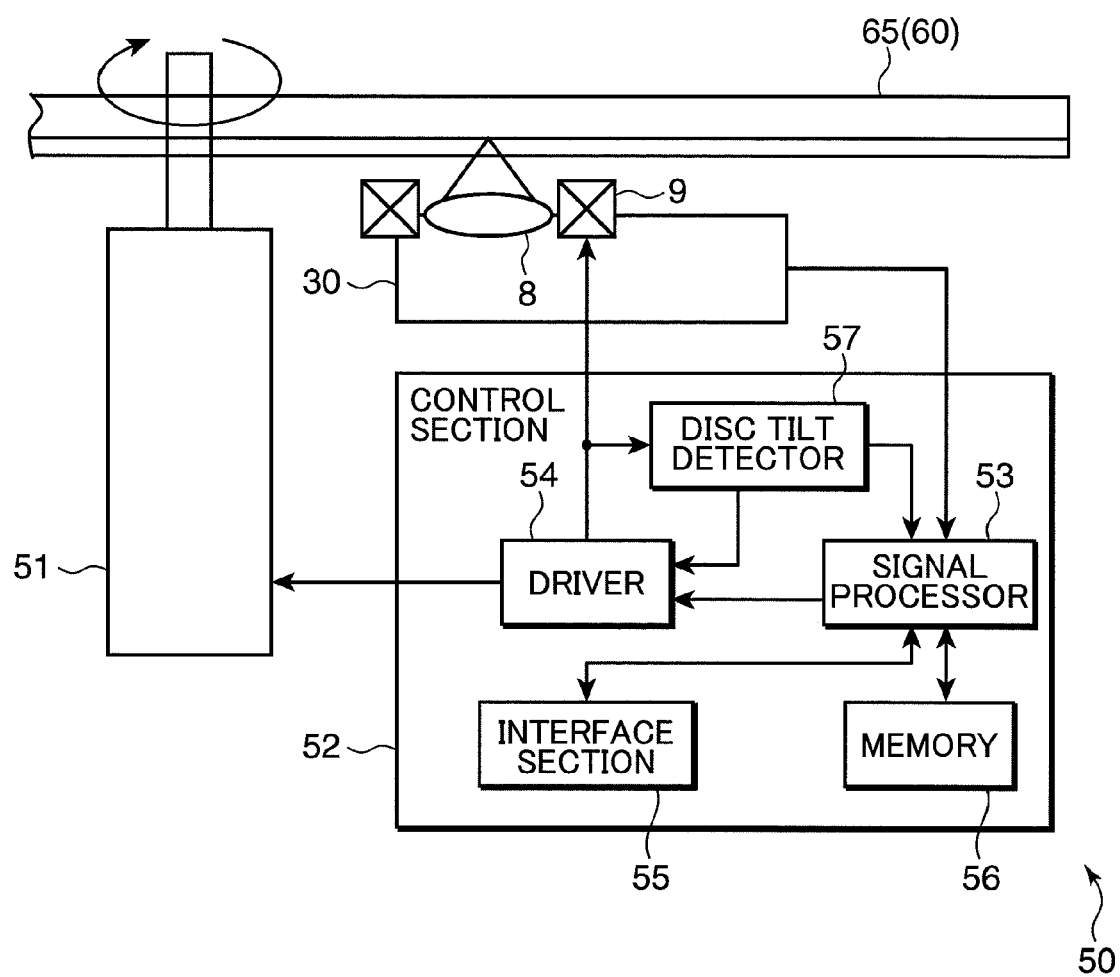
FIG. 11 is a diagram showing a schematic arrangement of an optical disc device in the first embodiment of the invention.

FIG. 11 is a diagram showing a schematic arrangement of the optical disc device in the first embodiment of the invention. As shown in FIG. 11, after adjustment of a tilt of the objective lens 8 in two axes directions, the optical head 30 adhesively fixed with the objective lens actuator 9 is loaded in an optical disc device 50. The optical disc device 50 includes the optical head 30, an optical disc driving section 51 for rotatably driving an optical disc, and a control section 52 for driving and controlling the optical disc driving section 51 and the optical head 30.

The control section 52 includes a signal processing section 53 for generating a control signal based on a servo signal and an information signal indicating light received by the optical head 30, a driver 54 for driving the optical disc driving section 51 and the optical head 30 based on a control signal generated by the signal processing section 53, an interface section 55 for interfacing an information signal between the exterior and the interior of the optical disc device 50, a memory 56 for storing information, and a disc tilt detector 57 for detecting a tilt of the multilayer optical disc 60.

In the following, a learning sequence of an optimum tilt angle of the objective lens 8 is described. The learning sequence of an optimum tilt angle of the objective lens 8 is as follows.

The optical disc device 50 is loaded with a reference optical disc 65 for learning. The driver 54 moves the optical head 30 to a predetermined position in a radial direction of the reference optical disc 65 for learning to thereby start a reproducing operation. The signal processing section 53 generates an actuator control signal, based on a focus error signal and a tracking error signal (a servo signal) to be outputted from the optical head 30, and outputs the actuator control signal to the driver 54. The driver 54 drives the objective lens actuator 9 in the optical head 30 in the focus direction FD and the tracking direction TD, based on the actuator control signal.

Next, the signal processing section 53 calculates an optimum tilt angle β of the objective lens 8 which optimizes a predetermined reproduction signal index, while outputting, to the driver 54, an actuator control signal for tilting the objective lens 8 in the radial direction RD of the reference optical disc 65. Specifically, it is preferable to calculate an optimum tilt angle β of the objective lens 8 so that the jitter is minimized, the amplitude of the information signal is maximized, or the amplitude of the tracking error signal is maximized. The signal processing section 53 stores the calculated optimum tilt angle β into the memory 56 in the optical disc device 50. Further, the reference optical disc 65 may be tilted. In view of the above, it is preferable to correct the optimum tilt angle β, based on a tilt (a disc tilt) of the reference optical disc 65 to be separately measured by the disc tilt detector 57, which is described later.

The optimum tilt angle β of the objective lens 8 is an angle to be obtained after correcting e.g. the aforementioned measurement error and displacement in adhesive fixation after adjustment of a tilt in two axes directions, with respect to the radial direction of an optical disc, and is an optimum tilt angle of the objective lens 8 free of a tilt (a disc tilt) of an optical disc. Accordingly, the optimum tilt angle β becomes a reference for use in correcting a third-order coma aberration resulting from a disc tilt, which is described later.

The optimum tilt angle β of the objective lens 8 differs among the information recording surfaces having light transmissive layers of different thicknesses in the multilayer optical disc 60. In view of the above, it is preferable to learn the optimum tilt angle β with respect to each of the information recording surfaces L0 through L3, in the case where the multilayer optical disc 60 has the four information recording surface, as described in the first embodiment. Further, it is preferable to store optimum tilt angles β0 through β3 of the objective lens with respect to the respective information recording surfaces L0 through L3 into the memory 56 of the optical disc device 50.

As described above, the memory 56 stores the optimum tilt angle β of the objective lens 8 with respect to a predetermined reference optical disc. Further, the objective lens actuator 9 tilts the objective lens 8, depending on a tilt angle θ of the multilayer optical disc 60 detected by the disc tilt detector 57, while using the optimum tilt angle β as a reference.

Alternatively, it is possible to learn the optimum tilt angles β0 and β3 of two information recording surfaces i.e. the information recording surface L0 having a largest light transmissive layer thickness of e.g. 100 μm and the information recording surface L3 having a smallest light transmissive layer thickness of e.g. 55 μm; and estimate the optimum tilt angles β1 and β2 of the intermediate information recording surfaces i.e. the information recording surface L1 and the information recording surface L2, using the optimum tilt angles β0 and β3. Learning the optimum tilt angles as described above enables to shorten the learning time.

Next, a method for correcting a third-order coma aberration resulting from a tilt (a disc tilt) of the multilayer optical disc 60 to be recorded or reproduced is described. The optical disc device 50 is provided with the disc tilt detector 57 for detecting a tilt (a disc tilt) of the loaded multilayer optical disc 60.

Figure 12:
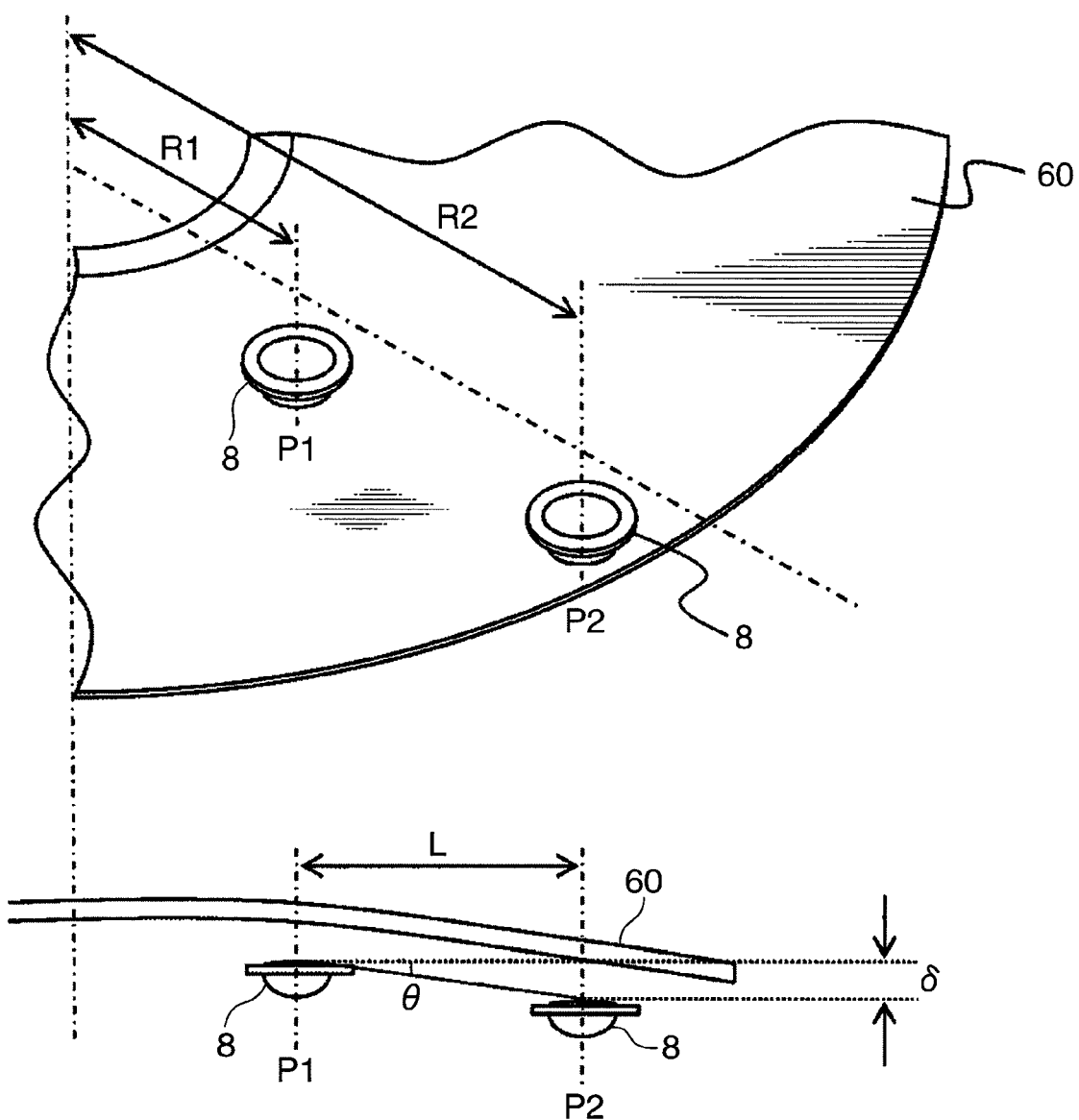
FIG. 12 is a diagram for describing a method for detecting a disc tilt in the first embodiment of the invention.

FIG. 12 is a diagram for describing a method for detecting a disc tilt in the first embodiment of the invention. For instance, in response to loading the multilayer optical disc 60 to be recorded or reproduced in the optical disc device 50, the disc tilt detector 57 performs a focus control with respect to two positions (a position having an inner circumferential radius R1 and a position having an outer circumferential radius R2) whose radial values on the multilayer optical disc 60 are different from each other, as shown in FIG. 12, to detect values of a focus drive current flowing through the objective lens actuator 9, respectively. Specifically, the disc tilt detector 57 performs a focus control with respect to the position P1 having the inner circumferential radius R1 of the multilayer optical disc 60, and the position P2 having the outer circumferential radius R2 of the multilayer optical disc 60 different from the inner circumferential radius R1 to detect values of a focus drive current flowing through the objective lens actuator 9.

The disc tilt detector 57 calculates heights of the objective lens 8 in the optical axis direction at the position P1 and the position P2, based on the respective corresponding focus drive current values, and a focus drive sensitivity of the objective lens actuator 9. The disc tilt detector 57 calculates an average disc tilt angle θ of the loaded multiyear optical disc 60, based on a difference δ between the height of the objective lens 8 at the position P1 and the height of the objective lens 8 at the position P2, and a distance L between the position P1 and the position P2.

As another method for detecting a disc tilt, there is known a method using an LED (Light Emitting Diode), and a photodetector which is divided into two areas with respect to a radial direction of an optical disc. In the detection method, emission light from the LED is reflected on an optical disc, reflection light from the optical disc is detected by the two-division photodetector, and a disc tilt is detected by computing a difference between two outputs from the two areas of the photodetector, whereby a disc tilt angle θ is calculated.

Since the aberration amount of third-order coma aberration resulting from a disc tilt is large on the information recording surface L0 having a largest light transmissive layer thickness, it is essentially required to correct a third-order coma aberration resulting from a lens tilt.

Now, let us consider a case, wherein there remains a third-order coma aberration in the objective lens 8, and an optimum tilt angle (the sum of a tilt of the objective lens after adjustment of a tilt in two axes directions, and the optimum tilt angle β) for use in correcting the residual third-order coma aberration is 0.3 deg. Since the objective lens 8 in the first embodiment is adapted to correct a third-order coma aberration on the information recording surface L0, resulting from tilting the multilayer optical disc 60 by 0.2 deg, it is necessary to tilt the objective lens 8 by 0.38 deg. In other words, it is necessary to maximally tilt the objective lens 8 by 0.68 deg for correcting a third-order coma aberration on the information recording surface L0.

Figure 13:
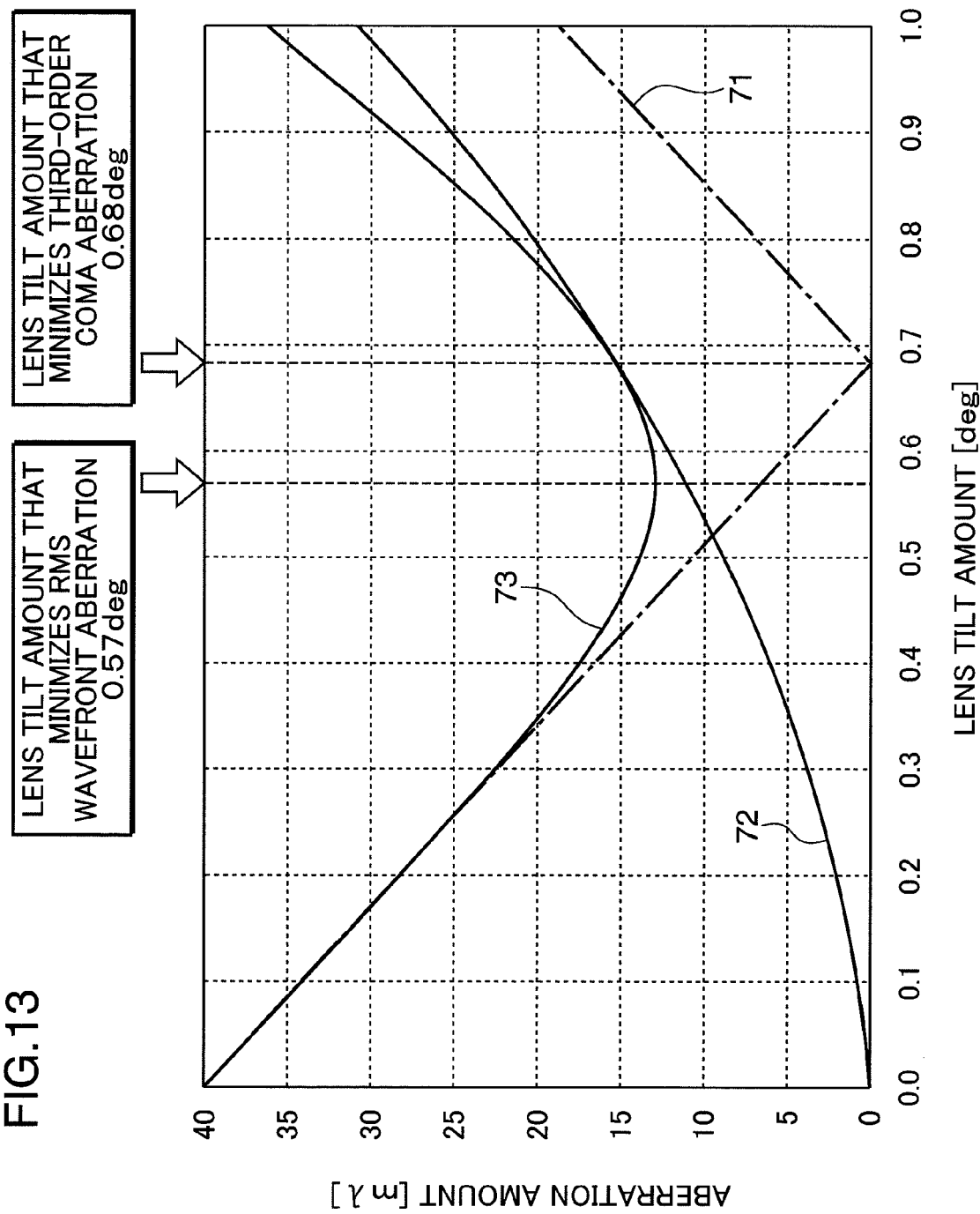
FIG. 13 is a diagram showing a relation between a lens tilt; and aberration amounts of a third-order coma aberration, a third-order astigmatism, and an RMS wavefront aberration resulting from a lens tilt in the first embodiment of the invention.

FIG. 13 is a diagram showing a relation between a tilt (a lens tilt) of an objective lens; and a third-order coma aberration 71, a third-order astigmatism 72, and an RMS wavefront aberration 73 resulting from a lens tilt. Referring to FIG. 13, the axis of abscissas represents a lens tilt amount, and the axis of ordinate represents aberration amounts of the third-order coma aberration 71, the third-order astigmatism 72, and the RMS wavefront aberration 73.

In the aforementioned conditions, it is necessary to set a lens tilt to 0.68 deg so as to minimize the third-order coma aberration 71 i.e. make the third-order coma aberration 71 zero, wherein the third-order coma aberration 71 is the sum of a third-order coma aberration of the objective lens 8, and a third-order coma aberration on the information recording surface L0 resulting from tilting the multilayer optical disc 60 by 0.2 deg. Since the aberration amount of the third-order astigmatism 72 in the above state is 15 mλ, the aberration amount of the RMS wavefront aberration (the total wavefront aberration) 73, which is the sum of the third-order coma aberration 71 and the third-order astigmatism 72, becomes 15 mλ. On the other hand, as is obvious from FIG. 13, although the aberration amount of the RMS wavefront aberration 73 when the lens tilt is 0.57 deg becomes a minimum value (i.e. 12 mλ), the aberration amount of the third-order coma aberration 71 in the above state is not minimized i.e. does not become zero.

As described above, in the case where a third-order coma aberration resulting from a disc tilt is large, and a third-order coma aberration resulting from a lens tilt is small, the lens tilt amount required for correcting a third-order coma aberration is increased. In view of the above, it is preferable to control the objective lens actuator 9 to tilt the objective lens 8 in such a manner that the RMS wavefront aberration is minimized, considering a third-order astigmatism resulting from a lens tilt.

Since the lens tilt amount that minimizes the RMS wavefront aberration depends on a third-order coma aberration of the objective lens 8, and a third-order coma aberration resulting from a disc tilt, the lens tilt amount cannot be uniquely determined. However, it is possible to determine whether a third-order astigmatism is to be considered, based on the design specifications of the objective lens 8, and the thickness of a light transmissive layer of a targeted information recording surface.

As described above, a factor which worsens an aberration is different among the information recording surfaces of a multilayer optical disc having the three or more information recording surfaces. In view of the above, it is necessary to design the objective lens in such a manner as to optimize the aberration amount of third-order coma aberration resulting from a lens tilt. As compared with a conventional objective lens, an objective lens for an optical head compatible with a multilayer optical disc is designed in such a manner that the aberration amount of third-order coma aberration resulting from tilting the objective lens by a unit angle is reduced. Further, the aberration amount of third-order coma aberration resulting from tilting the objective lens by a unit angle in converging laser light on the information recording surface L0 having a largest light transmissive layer thickness is minimized.

On the other hand, as described above, assuming that the aberration amount of third-order coma aberration resulting from tilting an objective lens by a unit angle in converging laser light on the information recording surface L3 is CML0 (unit: mλ/deg), and the aberration amount of third-order coma aberration resulting from tilting the objective lens by a unit angle in converging laser light on the information recording surface L3 is CML3 (unit: mλ/deg), the objective lens for the optical head compatible with the multilayer optical disc satisfies the requirement: 2.5≧CML3/CML0≧1.5. Accordingly, the aberration amount of third-order coma aberration resulting from tilting the objective lens by a unit angle in converging laser light on the information recording surface L3 is sufficiently larger than the aberration amount of third-order coma aberration resulting from tilting the objective lens by a unit angle in converging laser light on the information recording surface L0.

As described above, in correcting a third-order coma aberration of an optical head compatible with a multilayer optical disc having three or more information recording surfaces, in the case where laser light is converged on an information recording surface having a largest light transmissive layer thickness, it is necessary to consider a third-order astigmatism resulting from a lens tilt, in addition to a third-order coma aberration resulting from a disc tilt. In view of the above, it is preferable to determine the lens tilt angle in such a manner that the third-order coma aberration resulting from a lens tilt becomes smaller than the third-order coma aberration resulting from a disc tilt so as to minimize the RMS wavefront aberration.

On the other hand, in the case where laser light is converged on an information recording surface having a smallest light transmissive layer thickness, a third-order astigmatism resulting from a lens tilt can be neglected. In view of the above, it is preferable to determine the lens tilt angle in such a manner that the third-order coma aberration resulting from a disc tilt becomes equal to the third-order coma aberration resulting from a lens tilt.

Specifically, assuming that the aberration amount of third-order coma aberration resulting from tilting the multilayer optical disc 60 by a unit angle is CMD0 (unit: mλ/deg), the aberration amount of third-order coma aberration resulting from tilting the objective lens 8 by a unit angle is CML0 (unit: mλ/deg), a tilt angle of the multilayer optical disc 60 detected by the disc tilt detector 57 is θ, a coefficient is k0, and a tilt angle of the objective lens 8 by the objective lens actuator 9 is α0 in converging laser light on the information recording surface L0 having a largest light transmissive layer thickness, the objective lens actuator 9 tilts the objective lens 8 in such a manner that the tilt angle α0 of the objective lens 8 satisfies the following mathematical expression (3).

$$\alpha 0 = \theta \times k0 \times CMD0/CML0, \text{ where } 0.5 < k0 < 0.9 \quad (3)$$

Further, assuming that the aberration amount of third-order coma aberration resulting from tilting the multilayer optical disc 60 by a unit angle is CMD3 (unit: mλ/deg), the aberration amount of third-order coma aberration resulting from tilting the objective lens 8 by a unit angle is CML3 (unit: mλ/deg), and a tilt angle of the objective lens 8 by the objective lens actuator 9 is α3 in converging laser light on the information recording surface L3 having a smallest light transmissive layer thickness, the objective lens actuator 9 tilts the objective lens 8 in such a manner that the tilt angle α3 of the objective lens 8 satisfies the following mathematical expression (4).

$$\alpha 3 = \theta \times k0 \times CMD3/CML3 \quad (4)$$

In the mathematical expressions (3) and (4), the term "k0×CMD0/CML0" or the term "CMD3/CML3" to be multiplied by the tilt angle (the disc tilt angle) θ of the multilayer optical disc 60 is called as a tilt correction coefficient for sake of convenience.

Further, assuming that the aberration amount of third-order coma aberration resulting from tilting the multilayer optical disc 60 by a unit angle is CMD1 (unit: mλ/deg), the aberration amount of third-order coma aberration resulting from tilting the objective lens 8 by a unit angle is CML1 (unit: mλ/deg), and a tilt angle of the objective lens 8 by the objective lens actuator 9 is α1 in converging laser light on the information recording surface L1 adjacent to the information recording surface L0; and assuming that the aberration amount of third-order coma aberration resulting from tilting the multilayer optical disc 60 by a unit angle is CMD2 (unit: mλ/deg), the aberration amount of third-order coma aberration resulting from tilting the objective lens 8 by a unit angle is CML2 (unit: mλ/deg), and a tilt angle of the objective lens 8 by the objective lens actuator 9 is α2 in converging laser light on the information recording surface L2 adjacent to the side of the light incident surface of the information recording surface L1, the objective lens actuator 9 may tilt the objective lens 8 in such a manner that the tilt angle α1 of the objective lens 8 satisfies the mathematical expression (5), and the tilt angle α2 of the objective lens 8 satisfies the mathematical expression (6).

$$\alpha 1 = \theta \times CMD1/CML1 \quad (5)$$

$$\alpha 2 = \theta \times CMD2/CML2 \quad (6)$$

Further, assuming that the aberration amount of third-order coma aberration resulting from tilting the multilayer optical disc 60 by a unit angle is CMD1 (unit: mλ/deg), the aberration amount of third-order coma aberration resulting from tilting the objective lens 8 by a unit angle is CML1 (unit: mλ/deg), a coefficient is k1, and a tilt angle of the objective lens 8 by the objective lens actuator 9 is α1 in converging laser light on the information recording surface L1 adjacent to the information recording surface L0; and assuming that the aberration amount of third-order coma aberration amount resulting from tilting the multilayer optical disc 60 by a unit angle is CMD2 (unit: mλ/deg), the aberration amount of third-order coma aberration resulting from tilting the objective lens 8 by a unit angle is CML2 (unit: mλ/deg), a coefficient is k2, and a tilt angle of the objective lens 8 by the objective lens actuator 9 is α2 in converging laser light on the information recording surface L2 adjacent to the side of the light incident surface of the information recording surface L1; the objective lens actuator 9 may tilt the objective lens 8 in such a manner that the tilt angle α1 of the objective lens 8 satisfies the mathematical expression (7), and the tilt angle α2 of the objective lens 8 satisfies the mathematical expression (8). The above arrangement is more advantageous in accurately correcting a third-order coma aberration.

$$\alpha 1 = \theta \times k1 \times CMD1/CML1, \text{ where } k0 < k1 < 1 \quad (7)$$

$$\alpha 2 = \theta \times k2 \times CMD2/CML2, \text{ where } k0 < k1 \leq k2 < 1 \quad (8)$$

It is known that an optimum tilt correction coefficient for each of the information recording surfaces is substantially linearly changed with respect to the thickness of a light transmissive layer. In view of the above, assuming that the distance from the information recording surface L0 to the light incident surface is d0, the distance from the information recording surface L1 to the light incident surface is d1, the distance from the information recording surface L0 to the light incident surface is d2, and the distance from the information recording surface L3 to the light incident surface is d3, the objective lens actuator 9 may tilt the objective lens 8 in such a manner that the tilt angle $\alpha 1$ of the objective lens 8 satisfies the mathematical expression (9), and the tilt angle $\alpha 2$ of the objective lens 8 satisfies the mathematical expression (10).

$$\alpha 1 = \theta \times \{(d1-d3)/(d0-d3) \times (k0 \times CMD0/CML0 - CMD3/CML3) + CMD3/CML3\} \quad (9)$$

$$\alpha 2 = \theta \times \{(d2-d3)/(d0-d3) \times (k0 \times CMD0/CML0 - CMD3/CML3) + CMD3/CML3\} \quad (10)$$

The above mathematical expressions (9) and (10) can be expressed as follows. Specifically, assuming that the tilt angle of the objective lens 8 by the objective lens actuator 9 is $\alpha x$ in converging laser light on an information recording surface Lx located between the information recording surface L0 having a largest light transmissive layer thickness, and the information recording surface Ln having a smallest light transmissive layer thickness; and the aberration amount of third-order coma aberration resulting from tilting the multilayer optical disc 60 by a unit angle is CMDn (unit: m$\lambda$/deg), the aberration amount of third-order coma aberration resulting from tilting the objective lens 8 by a unit angle is CMLn (unit: m$\lambda$/deg), the distance from the information recording surface L0 to the light incident surface is d0, the distance from the information recording surface Lx to the light incident surface is dx, and the distance from the information recording surface Ln to the light incident surface is dn in converging laser light on the information recording surface Ln, the objective lens actuator 9 may tilt the objective lens 8 in such a manner that the tilt angle $\alpha x$ of the objective lens 8 satisfies the following mathematical expression (11).

$$\alpha x = \theta \times \{(dx \times dn)/(d0-dn) \times (k0 \times CMD0/CML0 - CMDn/CMLn) + CMDn/CMLn\} \quad (11)$$

As described above, the lens tilt amount that minimizes the RMS wavefront aberration depends on a third-order coma aberration of the objective lens 8 and a third-order coma aberration resulting from a disc tilt; or an influence of a third-order coma aberration on an information recording surface is increased, as the light transmissive layer thickness is increased. In view of the above, it is preferable to control the driver 54 in such a manner that the tilt angle (the lens tilt amount) $\alpha 0$ of the objective lens 8 is obtained by making the coefficient k0 variable depending on e.g. the tilt angle $\theta$ of the multilayer optical disc 60 in order to accurately correct a third-order coma aberration on the information recording surface L0 having a largest light transmissive layer thickness.

More preferably, the driver 54 is controlled in such a manner that an initial tilt angle of the objective lens 8, in other words, a tilt of the objective lens 8 after adjustment of a tilt in two axes directions, and the optimum tilt angle $\beta$ are obtained, and the tilt angle $\alpha 0$ of the objective lens 8 is obtained by making the coefficient k0 variable depending on the initial tilt angle.

The aberration amount of third-order coma aberration resulting from a disc tilt is small on the information recording surface L3 having a smallest light transmissive layer thickness, of the multilayer optical disc 60 having the four information recording surfaces. Accordingly, an influence of the third-order coma aberration is small in performing a recording/reproducing operation.

In the multilayer optical disc 60 of the first embodiment, in the case where the disc tilt is 0.2 deg, a third-order coma aberration on the information recording surface L3 having a light transmissive layer thickness of 55 μm is 12 m$\lambda$. On the other hand, in the optical head 30 of the first embodiment, the lens tilt angle of the objective lens 8 necessary for correcting a third-order coma aberration of 12 m$\lambda$ is 0.10 deg.

In the above case, if the sum of a detection error of a disc tilt, and a control error of a lens tilt is ±0.10 deg, a third-order coma aberration after the control includes an error in the range of ±12 m$\lambda$. In this case, it is substantially impossible to obtain an effect of third-order coma aberration correction. This is because the aberration amount of third-order coma aberration resulting from a disc tilt is small, and the aberration amount of third-order coma aberration resulting from a lens tilt is large on the information recording surface having a smallest light transmissive layer thickness, with the result that an effect of correcting a third-order coma aberration resulting from a lens tilt is small.

In view of the above, the objective lens actuator 9 may not necessarily tilt the objective lens 8 in converging laser light on the information recording surface L3 having a smallest light transmissive layer thickness. In the above case, since a third-order coma aberration resulting from a disc tilt is not corrected with respect to the information recording surface L3 having a smallest light transmissive layer thickness, the optical disc device can be simplified, and a time required for starting a recording operation or a reproducing operation can be reduced.

In the first embodiment, described is an optical head and an optical disc device for recording or reproducing information with respect to a multilayer optical disc having the four information recording surfaces L0 through L3 with the light transmissive layer thicknesses in the range of from 100 μm to 55 μm. The multilayer optical disc to be used in the invention is not limited to the multilayer optical disc having the above structure. It is needless to say that the optical head and the optical disc device in the first embodiment are widely used for a multilayer optical disc having three or more information recording surfaces, in other words, a multilayer optical disc, wherein the distance between the information recording surface having a largest light transmissive layer thickness, and the information recording surface having a smallest light transmissive layer thickness is larger than that in a conventional optical disc.

The optical head is not limited to an arrangement provided with a single light source and a single objective lens, but may include an arrangement provided with plural light sources for emitting light of different wavelengths and plural objective lenses. For instance, providing a red laser light source and an infrared laser light source in addition to the blue-violet laser light source enables to realize an optical head and an optical disc device capable of recording or reproducing with respect to a DVD and a CD, in addition to a multiyear optical disc having three or more information recording surfaces, and a conventional BD having two information recording surfaces.

In the first embodiment, the multilayer optical disc 60 corresponds to an example of an information recording medium, the blue-violet laser light source 1 corresponds to an example of a light source, the objective lens 8 corresponds to an example of an objective lens, the collimator lens actuator 14 corresponds to an example of a spherical aberration correcting section, the objective lens actuator 9 corresponds to an example of a lens tilting section, the disc tilt detector 57 corresponds to an example of a tilt detecting section, and the memory 56 corresponds to an example of a storing section.

Second Embodiment

Figure 14:
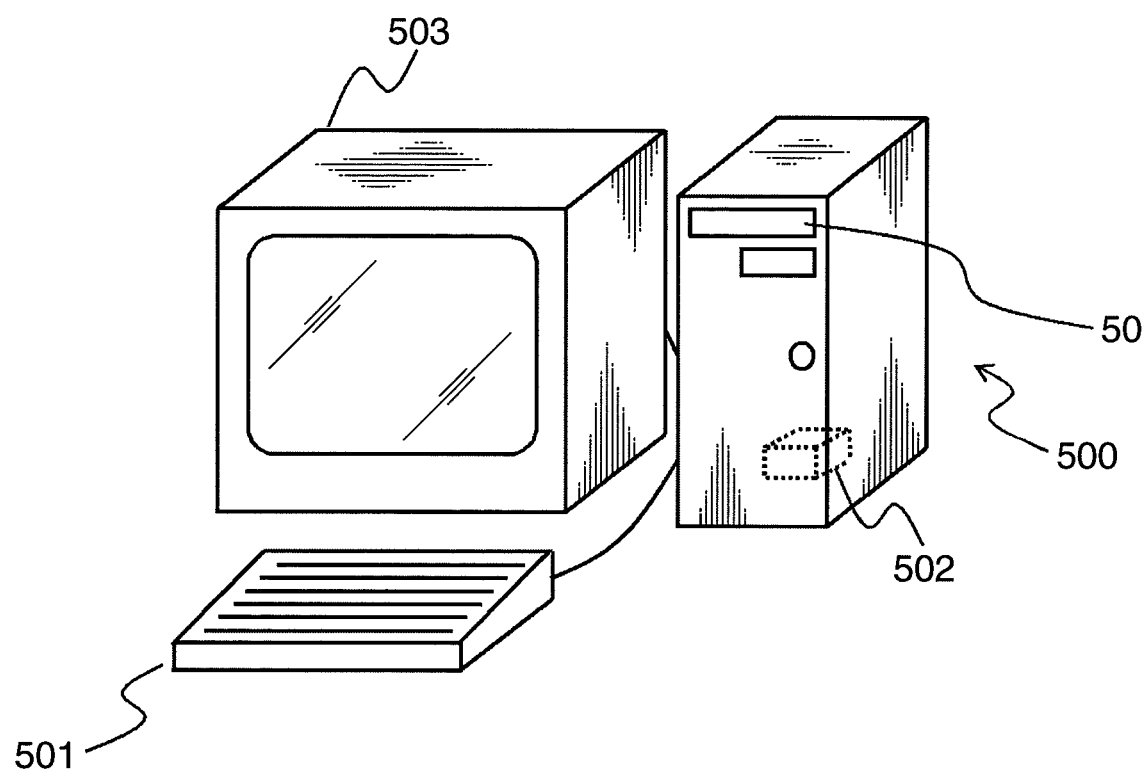
FIG. 14 is a diagram showing a schematic arrangement of a computer in the second embodiment of the invention.

FIG. 14 is a diagram showing a schematic arrangement of a computer in the second embodiment of the invention.

Referring to FIG. 14, a computer 500 includes the optical disc device 50 of the first embodiment; an input device 501 such as a keyboard, a mouse, or a touch panel for allowing a user to input information; a computing device 502 such as a central processing unit (CPU) for performing computation based on the information inputted through the input device 501, information read out from the optical disc device 50, or the like; and an output device 503 such as a CRT or a liquid crystal display device for displaying information such as a computation result by the computing device 502, or a printer for printing information.

In the second embodiment, the computer 500 corresponds to an example of an information processing device, and the computing device 502 corresponds to an example of an information processing section.

Since the computer 500 is provided with the optical disc device 50 of the first embodiment, information can be advantageously recorded or reproduced with respect to a multilayer optical disc having three or more information recording surfaces. Thus, the computer 500 is advantageously used for a variety of purposes.

Third Embodiment

Figure 15:
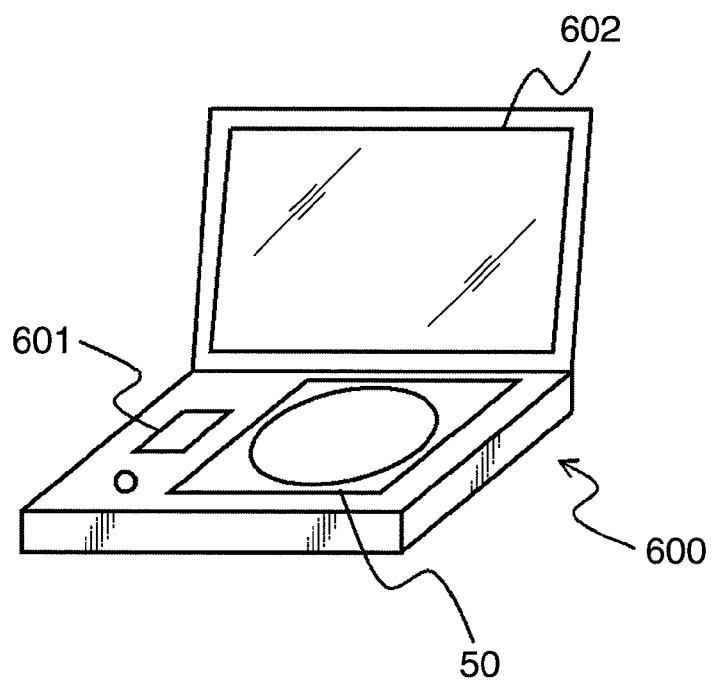
FIG. 15 is a diagram showing a schematic arrangement of an optical disc player in the third embodiment of the invention.

FIG. 15 is a diagram showing a schematic arrangement of an optical disc player in the third embodiment of the invention.

Referring to FIG. 15, an optical disc player 600 includes the optical disc device 50 of the first embodiment, and a decoder 601 for converting an information signal to be obtained from the optical disc device 50 into an image signal.

The optical disc player 600 can be used as a car navigation system by adding a position sensor such as a GPS, and a central processing unit (CPU). It is also possible to configure an arrangement incorporated with a display device 602 such as a liquid crystal monitor.

In the third embodiment, the optical disc player 600 corresponds to an example of an information processing device, and the decoder 601 corresponds to an example of an information processing section.

Since the optical disc player 600 is provided with the optical disc device 50 of the first embodiment, information can be advantageously recorded or reproduced with respect to a multilayer optical disc having three or more information recording surfaces. Thus, the optical disc player 600 is advantageously used for a variety of purposes.

Fourth Embodiment

Figure 16:
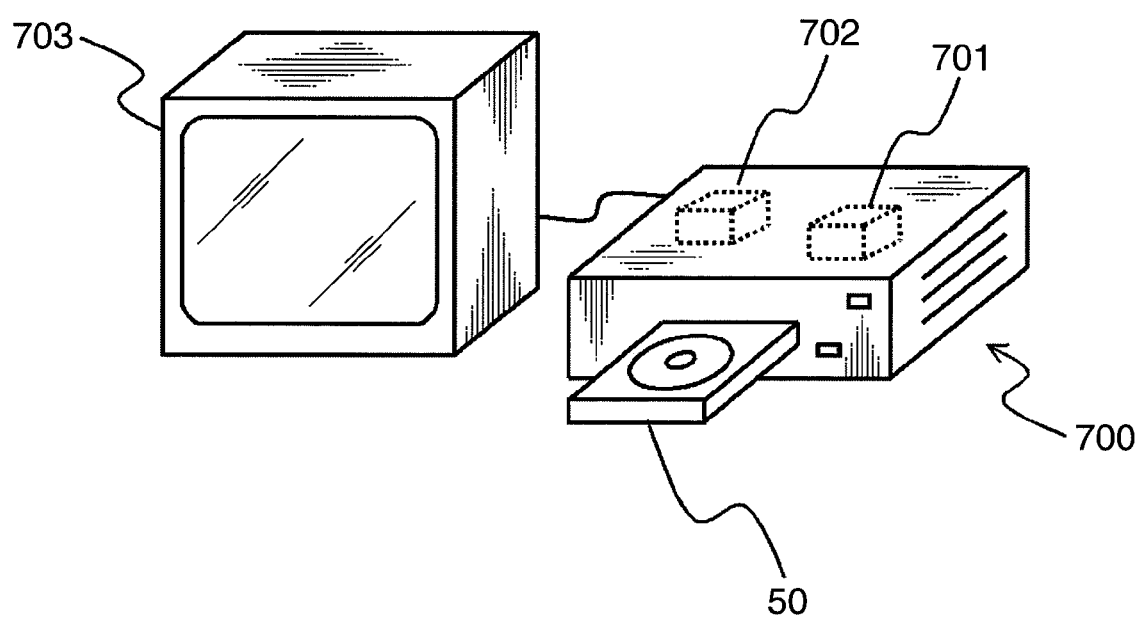
FIG. 16 is a diagram showing a schematic arrangement of an optical disc recorder in the fourth embodiment of the invention.
Figure 17:
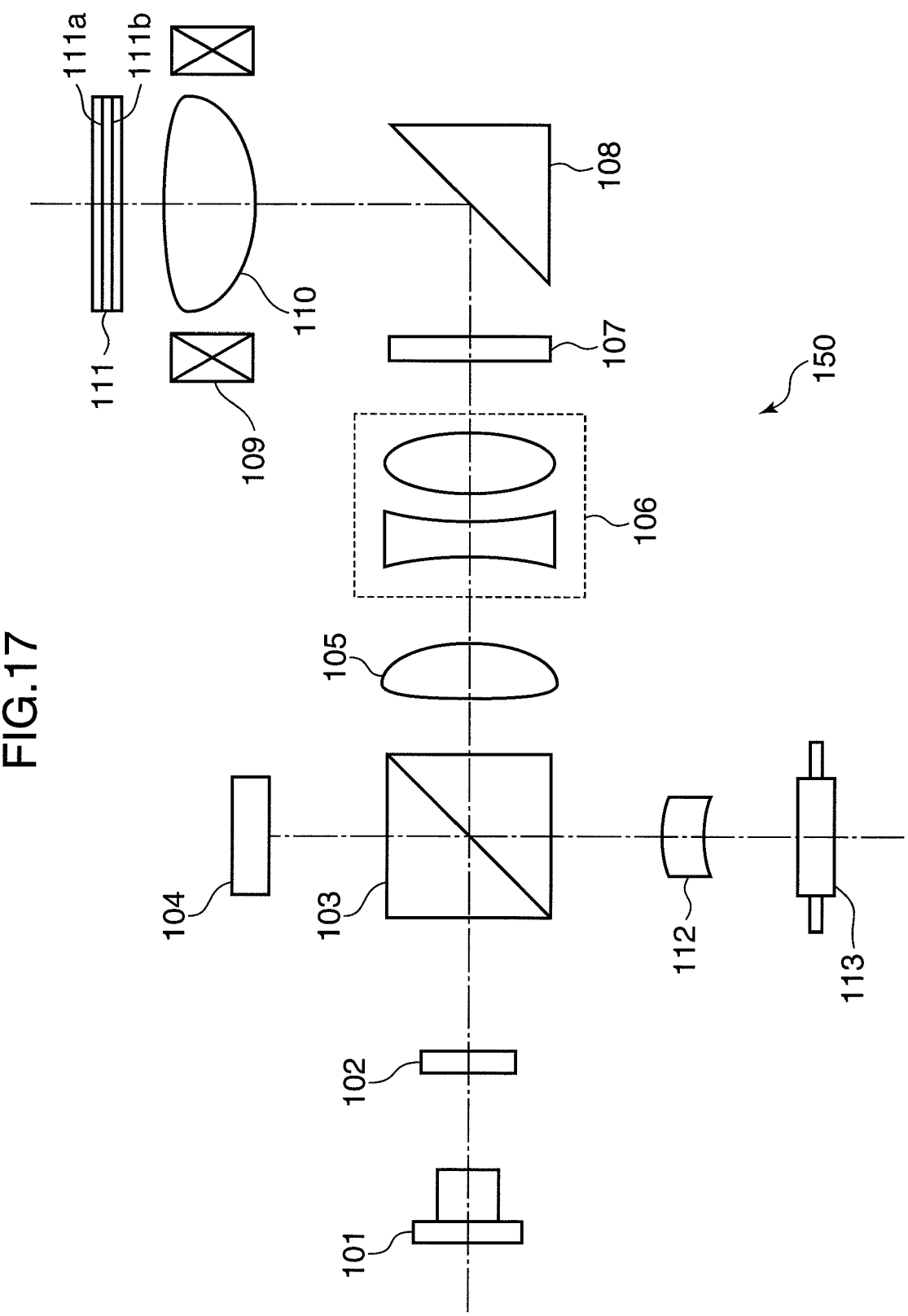
FIG. 17 is a diagram showing a schematic arrangement of a conventional optical head.

FIG. 16 is a diagram showing a schematic arrangement of an optical disc recorder in the fourth embodiment of the invention.

Referring to FIG. 16, an optical disc recorder 700 includes the optical disc device 50 of the first embodiment, and an encoder 701 for converting image information into an information signal for recording information into an optical disc by the optical disc device 50. A decoder 702 for converting an information signal to be obtained from the optical disc device 50 into image information may be additionally provided to reproduce a recorded image. Further alternatively, the optical disc recorder 700 may be provided with an output device 703 such as a CRT or a liquid crystal display device for displaying information, or a printer for printing information.

In the fourth embodiment, the optical disc recorder 700 corresponds to an example of an information processing device, and the encoder 701 and the decoder 702 correspond to an example of an information processing section.

Since the optical disc recorder 700 is provided with the optical disc device 50 of the first embodiment, information can be advantageously recorded or reproduced with respect to a multilayer optical disc having three or more information recording surfaces. Thus, the optical disc recorder 700 is advantageously used for a variety of purposes.

As described above, the first through the fourth embodiments are provided based on a task involved in a multilayer information recording medium having three or more layers, i.e. a requirement to suppress an influence of a third-order astigmatism at the time of correcting a third-order coma aberration in advantageously recording and/or reproducing information with respect to the multilayer information recording medium having three or more information recording surfaces. Further, an object of the invention is to provide an objective lens, an optical head, and an optical disc device that enable to keep an RMS wavefront aberration from exceeding 0.07λ, which is Marechal criterion, as a result of performing an experiment based on the above finding.

The aforementioned embodiments mainly include the features having the following arrangements.

An optical disc device according to an aspect of the invention is an optical disc device is an optical disc device for recording or reproducing information with respect to an information recording medium having three or more information recording surfaces with light transmissive layers of different thicknesses from each other. The optical disc device includes a light source which emits laser light; an objective lens which converges the laser light emitted from the light source on a predetermined one of the information recording surfaces of the information recording medium; a spherical aberration correcting section which corrects a spherical aberration resulting from the thickness of the respective light transmissive layers of the information recording medium; a lens tilting section which tilts the objective lens in a radial direction of the information recording medium; and a tilt detecting section which detects a tilt of the information recording medium in the radial direction, wherein assuming that an aberration amount of third-order coma aberration resulting from tilting the information recording medium by a unit angle is CMD0 (unit: mλ/deg), an aberration amount of third-order coma aberration resulting from tilting the objective lens by a unit angle is CML0 (unit: mλ/deg), a tilt angle of the information recording medium detected by the tilt detecting section is θ, a coefficient is k0, and a tilt angle of the objective lens by the objective lens tilting section is α0 in converging the laser light on an information recording surface L0 having a largest light transmissive layer thickness out of the information recording surfaces of the information recording medium, the lens tilting section tilts the objective lens in such a manner that the tilt angle α0 of the objective lens satisfies the mathematical expression (12).

$$\alpha 0 = \theta \times k0 \times CMD0/CML0, \text{ where } 0.5 < k0 < 0.9 \tag{12}$$

In the above arrangement, the information recording medium has three or more information recording surfaces with light transmissive layers of different thicknesses from each other. The light source emits laser light, and the objective lens converges the laser light emitted from the light source on a predetermined one of the information recording surfaces of the information recording medium. The spherical aberration correcting section corrects a spherical aberration resulting from the thickness of the respective light transmissive layers of the information recording medium, the lens tilting section tilts the objective lens in a radial direction of the information recording medium, and the tilt detecting section detects a tilt of the information recording medium in the radial direction. Further, the lens tilting section tilts the objective lens in such a manner that the tilt angle α0 of the objective lens satisfies the mathematical expression (12).

Thus, the objective lens is tilted in such a manner that the total wavefront aberration is optimized in converging the laser light on the information recording surface L0 having a largest light transmissive layer thickness. Accordingly, information can be advantageously recorded or reproduced with respect to the information recording medium having three or more information recording surfaces with light transmissive layers of different thicknesses from each other.

In the optical disc device, assuming that an aberration amount of third-order coma aberration resulting from tilting the information recording medium by a unit angle is CMDn (unit: mλ/deg), an aberration amount of third-order coma aberration resulting from tilting the objective lens by a unit angle is CMLn (unit: mλ/deg), and a tilt angle of the objective lens by the objective lens tilting section is αn in converging the laser light on an information recording surface Ln having a smallest light transmissive layer thickness out of the information recording surfaces of the information recording medium, preferably, the lens tilting section may tilt the objective lens in such a manner that the tilt angle αn of the objective lens satisfies the mathematical expression (13).

$$\alpha n = \theta \times CMDn/CMLn \tag{13}$$

In the above arrangement, the lens tilting section tilts the objective lens in such a manner that the tilt angle αn of the objective lens satisfies the mathematical expression (13). Thus, the objective lens is tilted in such a manner that the total wavefront aberration is optimized in converging the laser light on the information recording surface Ln having a smallest light transmissive layer thickness. Accordingly, information can be advantageously recorded or reproduced with respect to the information recording medium having three or more information recording surfaces with light transmissive layers of different thicknesses from each other.

In the optical disc device, preferably, the lens tilting section may not tilt the objective lens in converging the laser light on an information recording surface Ln having a smallest light transmissive layer thickness out of the information recording surfaces of the information recording medium.

In the above arrangement, since the lens tilting section does not tilt the objective lens in converging the laser light on the information recording surface Ln having a smallest light transmissive layer thickness, the optical disc device can be simplified, and a time required for starting a recording operation or a reproducing operation can be shortened.

In the optical disc device, assuming that an aberration amount of third-order coma aberration resulting from tilting the objective lens by a unit angle is CML0 (unit mλ/deg) in converging the laser light on the information recording surface L0, and an aberration amount of third-order coma aberration resulting from tilting the objective lens by a unit angle is CMLn (unit: mλ/deg) in converging the laser light on the information recording surface Ln, preferably, the objective lens may satisfy the mathematical expression: 2.5≧CMLn/CML0≧1.5.

In the above arrangement, the objective lens is so designed as to satisfy the mathematical expression: 2.5≧CMLn/CML0≧1.5. Accordingly, the total wavefront aberration (RMS wavefront aberration) can be sufficiently reduced in converging the laser light on the information recording surface L0 having a largest light transmissive layer thickness, and the aberration amount of third-order coma aberration resulting from tilting the objective lens by a unit angle can be reduced in converging the laser light on the information recording surface Ln having a smallest light transmissive layer thickness.

In the optical disc device, assuming that an aberration amount of third-order coma aberration resulting from tilting the information recording medium by a unit angle is CMD1 (unit: mλ/deg), an aberration amount of third-order coma aberration resulting from tilting the objective lens by a unit angle is CML1 (unit: mλ/deg), and a tilt angle of the objective lens by the objective lens tilting section is α1 in converging the laser light on an information recording surface L1 adjacent to the information recording surface L0 out of the information recording surfaces of the information recording medium, preferably, the lens tilting section may tilt the objective lens in such a manner that the tilt angle α1 of the objective lens satisfies the mathematical expression (14).

$$\alpha 1 = \theta \times CMD1/CML1 \tag{14}$$

In the above arrangement, the lens tilting section tilts the objective lens in such a manner that the tilt angle α1 of the objective lens satisfies the mathematical expression (14). Thus, the objective lens is tilted in such a manner that the total wavefront aberration is optimized in converging the laser light on the information recording surface L1 adjacent to the information recording surface L0. Accordingly, information can be advantageously recorded or reproduced with respect to the information recording medium having three or more information recording surfaces with light transmissive layers of different thicknesses from each other.

In the optical disc device, assuming that an aberration amount of third-order coma aberration resulting from tilting the information recording medium by a unit angle is CMD2 (unit: mλ/deg), an aberration amount of third-order coma aberration resulting from tilting the objective lens by a unit angle is CML2 (unit: mλ/deg), and a tilt angle of the objective lens by the objective lens tilting section is α2 in converging the laser light on an information recording surface L2 adjacent to a side of a light incident surface of the information recording surface L1 out of the information recording surfaces of the information recording medium, preferably, the lens tilting section may tilt the objective lens in such a manner that the tilt angle α2 of the objective lens satisfies the mathematical expression (15).

$$\alpha 2 = \theta \times CMD2/CML2 \tag{15}$$

In the above arrangement, the lens tilting section tilts the objective lens in such a manner that the tilt angle α2 of the objective lens satisfies the mathematical expression (15). Thus, the objective lens is tilted in such a manner that the total wavefront aberration is optimized in converging the laser light on the information recording surface L2 adjacent to the side of the light incident surface of the information recording surface L1. Accordingly, information can be advantageously recorded or reproduced with respect to the information recording medium having three or more information recording surfaces with light transmissive layers of different thicknesses from each other.

In the optical disc device, assuming that an aberration amount of third-order coma aberration resulting from tilting the information recording medium by a unit angle is CMD1 (unit: mλ/deg), an aberration amount of third-order coma aberration resulting from tilting the objective lens by a unit angle is CML1 (unit: mλ/deg), a coefficient is k1, and a tilt angle of the objective lens by the objective lens tilting section is α1 in converging the laser light on an information recording surface L1 adjacent to the information recording surface L0, preferably, the lens tilting section may tilt the objective lens in such a manner that the tilt angle α1 of the objective lens satisfies the mathematical expression (16).

$$\alpha 1 = \theta \times k1 \times CMD1/CML1, \text{ where } k0 < k1 < 1 \quad (16)$$

In the above arrangement, the lens tilting section tilts the objective lens in such a manner that the tilt angle α1 of the objective lens satisfies the mathematical expression (16). Thus, the objective lens is tilted in such a manner that the total wavefront aberration is optimized in converging the laser light on the information recording surface L1 adjacent to the information recording surface L0. Accordingly, information can be advantageously recorded or reproduced with respect to the information recording medium having three or more information recording surfaces with light transmissive layers of different thicknesses from each other.

In the optical disc device, assuming that an aberration amount of third-order coma aberration resulting from tilting the information recording medium by a unit angle is CMD2 (unit: mλ/deg), an aberration amount of third-order coma aberration resulting from tilting the objective lens by a unit angle is CML2 (unit: mλ/deg), a coefficient is k2, and a tilt angle of the objective lens by the objective lens tilting section is α2 in converging the laser light on an information recording surface L2 adjacent to a side of a light incident surface of the information recording surface L1, preferably, the lens tilting section may tilt the objective lens in such a manner that the tilt angle α2 of the objective lens satisfies the mathematical expression (17).

$$\alpha 2 = \theta \times k2 \times CMD2/CML2, \text{ where } k0 < k1 \leq k2 < 1 \quad (17)$$

In the above arrangement, the lens tilting section tilts the objective lens in such a manner that the tilt angle α2 of the objective lens satisfies the mathematical expression (17). Thus, the objective lens is tilted in such a manner that the total wavefront aberration is optimized in converging the laser light on the information recording surface L2 adjacent to the side of the light incident surface of the information recording surface L1. Accordingly, information can be advantageously recorded or reproduced with respect to the information recording medium having three or more information recording surfaces with light transmissive layers of different thicknesses from each other.

In the optical disc device, assuming that a tilt angle of the objective lens by the objective lens tilting section is αx in converging the laser light on an information recording surface Lx located between the information recording surface L0 and the information recording surface Ln; assuming that an aberration amount of third-order coma aberration resulting from tilting the information recording medium by a unit angle is CMDn (unit: mλ/deg), and an aberration amount of third-order coma aberration resulting from tilting the objective lens by a unit angle is CMLn (unit: mλ/deg) in converging the laser light on the information recording surface Ln; and assuming that a distance from the information recording surface L0 to a light incident surface is d0, a distance from the information recording surface Lx to the light incident surface is dx, and a distance from the information recording surface Ln to the light incident surface is dn, preferably, the lens tilting section may tilt the objective lens in such a manner that the tilt angle αx of the objective lens satisfies the mathematical expression (18).

$$\alpha x = \theta \times \{(dx-dn)/(d0-dn) \times (k0 \times CMD0/CML0 - CMDn/CMLn) + CMDn/CMLn\} \quad (18)$$

In the above arrangement, the lens tilting section tilts the objective lens in such a manner that the tilt angle αx of the objective lens satisfies the mathematical expression (18). Thus, the objective lens is tilted in such a manner that the total wavefront aberration is optimized in converging the laser light on the information recording surface Lx located between the information recording surface L0 and the information recording surface Ln. Accordingly, information can be advantageously recorded or reproduced with respect to the information recording medium having three or more information recording surfaces with light transmissive layers of different thicknesses from each other.

In the optical disc device, preferably, the lens tilting section may make the coefficient k0 variable depending on the tilt angle θ of the information recording medium detected by the tilt detecting section in converging the laser light on the information recording surface L0.

In the above arrangement, since the coefficient k0 is made variable depending on the tilt angle θ of the information recording medium detected by the tilt detecting section in converging the laser light on the information recording surface L0, the total wavefront aberration can be more accurately set to an optimum value.

In the optical disc device, preferably, the lens tilting section may make the coefficient k0 variable depending on an initial tilt angle of the objective lens in converging the laser light on the information recording surface L0.

In the above arrangement, since the coefficient k0 is made variable depending on the initial tilt angle of the objective lens in converging the laser light on the information recording surface L0, the total wavefront aberration can be more accurately set to an optimum value.

Preferably, the optical disc device may further include a storing section which stores an optimum tilt angle β of the objective lens with respect to a predetermined reference optical disc, wherein the lens tilting section tilts the objective lens depending on the tilt angle θ of the information recording medium detected by the tilt detecting section, while using the optimum tilt angle β as a reference.

In the above arrangement, the storing section stores the optimum tilt angle β of the objective lens with respect to the predetermined reference optical disc, wherein the lens tilting section tilts the objective lens depending on the tilt angle θ of the information recording medium detected by the tilt detecting section, while using the optimum tilt angle β as a reference.

Thus, the objective lens is tilted, while using the optimum tilt angle β stored in advance in the storing section, as a reference, in converging the laser light on an information recording surface. Accordingly, the total wavefront aberration can be more accurately set to an optimum value.

In the optical disc device, preferably, the predetermined reference optical disc may have three or more information recording surfaces with light transmissive layers of different thicknesses from each other, and the storing section may store a plurality of the optimum tilt angles β corresponding to the respective information recording surfaces.

In the above arrangement, the storing section stores the plurality of the optimum tilt angles β corresponding to the respective information recording surfaces, and the objective lens is tilted, while using the optimum tilt angles β stored in advance with respect to the respective information recording surfaces, as a reference. Accordingly, the total wavefront aberration can be more accurately set to an optimum value.

In the optical disc device, preferably, the optimum tilt angle β may be a tilt angle of the objective lens, in the case where a predetermined reproduction signal index is optimized.

In the above arrangement, the objective lens is tilted, while using the tilt angle of the objective lens in the case where the predetermined reproduction signal index is optimized, as a reference. Accordingly, the total wavefront aberration can be more accurately set to an optimum value.

An optical head according to another aspect of the invention is an optical head for recording or reproducing information with respect to an information recording medium having three or more information recording surfaces with light transmissive layers of different thicknesses from each other. The optical head includes a light source which emits laser light; an objective lens which converges the laser light emitted from the light source on a predetermined one of the information recording surfaces of the information recording medium; a spherical aberration correcting section which corrects a spherical aberration resulting from the thickness of the respective light transmissive layers of the information recording medium; and a lens tilting section which tilts the objective lens in a radial direction of the information recording medium, wherein assuming that an aberration amount of third-order coma aberration resulting from tilting the objective lens by a unit angle is CML0 (unit: m$\lambda$/deg) in converging the laser light on an information recording surface L0 having a largest light transmissive layer thickness out of the information recording surfaces of the information recording medium, and an aberration amount of third-order coma aberration resulting from tilting the objective lens by a unit angle is CMLn (unit: m$\lambda$/deg) in converging the laser light on an information recording surface Ln having a smallest light transmissive layer thickness out of the information recording surfaces of the information recording medium, the objective lens satisfies the mathematical expression: $2.5 \geq \text{CMLn}/\text{CML0} \geq 1.5$.

In the above arrangement, the information recording medium has three or more information recording surfaces with light transmissive layers of different thicknesses from each other. The light source emits laser light, and the objective lens converges the laser light emitted from the light source on a predetermined one of the information recording surfaces of the information recording medium. The spherical aberration correcting section corrects a spherical aberration resulting from the thickness of the respective light transmissive layers of the information recording medium, and the lens tilting section tilts the objective lens in a radial direction of the information recording medium. Further, the objective lens is so designed as to satisfy the mathematical expression: $2.5 \geq \text{CMLn}/\text{CML0} \geq 1.5$. Accordingly, the total wavefront aberration (RMS wavefront aberration) can be sufficiently reduced in converging the laser light on the information recording surface L0 having a largest light transmissive layer thickness, and the aberration amount of third-order coma aberration resulting from tilting the objective lens by a unit angle can be reduced in converging the laser light on the information recording surface Ln having a smallest light transmissive layer thickness.

An information processing device according to yet another aspect of the invention is an information processing device including the optical disc device having any one of the above arrangements, and an information processing section which processes information to be recorded in the optical disc device and/or information reproduced from the optical disc device. In the above arrangement, the optical disc device can be applied to the information processing device.

The embodiments or the examples described in the section of description of embodiments are provided to clarify the technical contents of the invention. The invention should not be construed to be limited to the embodiments or the examples. The invention may be modified in various ways as far as such modifications do not depart from the spirit and the scope of the invention hereinafter defined.

INDUSTRIAL APPLICABILITY

The inventive optical disc device and the inventive optical head enable to advantageously record or reproduce information with respect to an information recording medium having three or more information recording surfaces with light transmissive layers of different thicknesses from each other.

Further, the inventive information processing device incorporated with the optical disc device enables to advantageously record or reproduce information with respect to an information recording medium having three or more information recording surfaces with light transmissive layers of different thicknesses from each other. Accordingly, the information processing device can be widely used for various purposes.

The invention claimed is:

1. An optical disc device for recording or reproducing information with respect to an information recording medium having three or more information recording surfaces with light transmissive layers of different thicknesses from each other, the optical disc device comprising:
    a light source which emits laser light;
    an objective lens which converges the laser light emitted from the light source on a predetermined one of the information recording surfaces of the information recording medium;
    a spherical aberration correcting section which corrects a spherical aberration resulting from the thickness of the respective light transmissive layers of the information recording medium;
    a lens tilting section which tilts the objective lens in a radial direction of the information recording medium; and
    a tilt detecting section which detects a tilt of the information recording medium in the radial direction, wherein
    assuming that an aberration amount of third-order coma aberration resulting from tilting the information recording medium by a unit angle is CMD0 (unit: m$\lambda$/deg), an aberration amount of third-order coma aberration resulting from tilting the objective lens by a unit angle is CML0 (unit: m$\lambda$/deg), a tilt angle of the information recording medium detected by the tilt detecting section is $\theta$, a coefficient is k0, and a tilt angle of the objective lens by the objective lens tilting section is $\alpha 0$ in converging the laser light on an information recording surface L0 having a largest light transmissive layer thickness out of the information recording surfaces of the information recording medium,
    the lens tilting section tilts the objective lens in such a manner that the tilt angle $\alpha 0$ of the objective lens satisfies the mathematical expression (1):

$\alpha 0 = \theta \times k0 \times CMD0/CML0$, where $0.5 < k0 < 0.9$ (1).

2. The optical disc device according to claim 1, wherein assuming that an aberration amount of third-order coma aberration resulting from tilting the information recording medium by a unit angle is CMDn (unit: m$\lambda$/deg), an aberration amount of third-order coma aberration resulting from tilting the objective lens by a unit angle is CMLn (unit: m$\lambda$/deg), and a tilt angle of the objective lens by the objective lens tilting section is $\alpha n$ in converging the laser light on an information recording surface Ln having a smallest light transmissive layer thickness out of the information recording surfaces of the information recording medium, the lens tilting section tilts the objective lens in such a manner that the tilt angle αn of the objective lens satisfies the mathematical expression (2):

$$\alpha n = \theta \times CMDn/CMLn \qquad (2).$$

3. The optical disc device according to claim 2, wherein assuming that an aberration amount of third-order coma aberration resulting from tilting the objective lens by a unit angle is CML0 (unit mλ/deg) in converging the laser light on the information recording surface L0, and an aberration amount of third-order coma aberration resulting from tilting the objective lens by a unit angle is CMLn (unit: mλ/deg) in converging the laser light on the information recording surface Ln, the objective lens satisfies the following mathematical expression:

$$2.5 \geq CMLn/CML0 \geq 1.5.$$

4. The optical disc device according to claim 1, wherein the lens tilting section does not tilt the objective lens in converging the laser light on an information recording surface Ln having a smallest light transmissive layer thickness out of the information recording surfaces of the information recording medium.

5. The optical disc device according to claim 1, wherein assuming that an aberration amount of third-order coma aberration resulting from tilting the information recording medium by a unit angle is CMD1 (unit: mλ/deg), an aberration amount of third-order coma aberration resulting from tilting the objective lens by a unit angle is CML1 (unit: mλ/deg), and a tilt angle of the objective lens by the objective lens tilting section is α1 in converging the laser light on an information recording surface L1 adjacent to the information recording surface L0 out of the information recording surfaces of the information recording medium, the lens tilting section tilts the objective lens in such a manner that the tilt angle α1 of the objective lens satisfies the mathematical expression (3):

$$\alpha 1 = \theta \times CMD1/CML1 \qquad (3).$$

6. The optical disc device according to claim 5, wherein assuming that an aberration amount of third-order coma aberration resulting from tilting the information recording medium by a unit angle is CMD2 (unit: mλ/deg), an aberration amount of third-order coma aberration resulting from tilting the objective lens by a unit angle is CML2 (unit: mλ/deg), and a tilt angle of the objective lens by the objective lens tilting section is α2 in converging the laser light on an information recording surface L2 adjacent to a side of a light incident surface of the information recording surface L1 out of the information recording surfaces of the information recording medium, the lens tilting section tilts the objective lens in such a manner that the tilt angle α2 of the objective lens satisfies the mathematical expression (4):

$$\alpha 2 = \theta \times CMD2/CML2 \qquad (4).$$

7. The optical disc device according to claim 1, wherein assuming that an aberration amount of third-order coma aberration resulting from tilting the information recording medium by a unit angle is CMD1 (unit: mλ/deg), an aberration amount of third-order coma aberration resulting from tilting the objective lens by a unit angle is CML1 (unit: mλ/deg), a coefficient is k1, and a tilt angle of the objective lens by the objective lens tilting section is α1 in converging the laser light on an information recording surface L1 adjacent to the information recording surface L0, the lens tilting section tilts the objective lens in such a manner that the tilt angle α1 of the objective lens satisfies the mathematical expression (5):

$$\alpha 1 = \theta \times k1 \times CMD1/CML1, \text{ where } k0 < k1 < 1 \qquad (5).$$

8. The optical disc device according to claim 7, wherein assuming that an aberration amount of third-order coma aberration resulting from tilting the information recording medium by a unit angle is CMD2 (unit: mλ/deg), an aberration amount of third-order coma aberration resulting from tilting the objective lens by a unit angle is CML2 (unit: mλ/deg), a coefficient is k2, and a tilt angle of the objective lens by the objective lens tilting section is α2 in converging the laser light on an information recording surface L2 adjacent to a side of a light incident surface of the information recording surface L1, the lens tilting section tilts the objective lens in such a manner that the tilt angle α2 of the objective lens satisfies the mathematical expression (6):

$$\alpha 2 = \theta \times k2 \times CMD2/CML2, \text{ where } k0 < k1 \leq k2 < 1 \qquad (6).$$

9. The optical disc device according to claim 1, wherein assuming that a tilt angle of the objective lens by the objective lens tilting section is αx in converging the laser light on an information recording surface Lx located between the information recording surface L0 and the information recording surface Ln;

assuming that an aberration amount of third-order coma aberration resulting from tilting the information recording medium by a unit angle is CMDn (unit: mλ/deg), and an aberration amount of third-order coma aberration resulting from tilting the objective lens by a unit angle is CMLn (unit: mλ/deg) in converging the laser light on the information recording surface Ln; and assuming that a distance from the information recording surface L0 to a light incident surface is d0, a distance from the information recording surface Lx to the light incident surface is dx, and a distance from the information recording surface Ln to the light incident surface is dn, the lens tilting section tilts the objective lens in such a manner that the tilt angle αx of the objective lens satisfies the mathematical expression (7):

$$\alpha x = \theta \times \{(dx-dn)/(d0-dn) \times (k0 \times CMD0/CML0 - CMDn/CMLn) + CMDn/CMLn\} \qquad (7).$$

10. The optical disc device according to claim 1, wherein the lens tilting section makes the coefficient k0 variable depending on the tilt angle θ of the information recording medium detected by the tilt detecting section in converging the laser light on the information recording surface L0.

11. The optical disc device according to claim 1, wherein the lens tilting section makes the coefficient k0 variable depending on an initial tilt angle of the objective lens in converging the laser light on the information recording surface L0.

12. The optical disc device according to claim 1, further comprising a storing section which stores an optimum tilt angle β of the objective lens with respect to a predetermined reference optical disc, wherein the lens tilting section tilts the objective lens depending on the tilt angle θ of the information recording medium detected by the tilt detecting section, while using the optimum tilt angle β as a reference.

13. The optical disc device according to claim 12, wherein the predetermined reference optical disc has three or more information recording surfaces with light transmissive layers of different thicknesses from each other, and the storing section stores a plurality of the optimum tilt angles β corresponding to the respective information recording surfaces.

14. The optical disc device according to claim 12, wherein the optimum tilt angle β is a tilt angle of the objective lens, in the case where a predetermined reproduction signal index is optimized.

15. An information processing device comprising:
the optical disc device of claim 1; and
an information processing section which processes information to be recorded in the optical disc device and/or information reproduced from the optical disc device.

16. An optical head for recording or reproducing information with respect to an information recording medium having three or more information recording surfaces with light transmissive layers of different thicknesses from each other, the optical head comprising:
a light source which emits laser light;
an objective lens which converges the laser light emitted from the light source on a predetermined one of the information recording surfaces of the information recording medium;
a spherical aberration correcting section which corrects a spherical aberration resulting from the thickness of the respective light transmissive layers of the information recording medium; and
a lens tilting section which tilts the objective lens in a radial direction of the information recording medium, wherein
assuming that an aberration amount of third-order coma aberration resulting from tilting the objective lens by a unit angle is CML0 (unit: mλ/deg) in converging the laser light on an information recording surface L0 having a largest light transmissive layer thickness out of the information recording surfaces of the information recording medium, and an aberration amount of third-order coma aberration resulting from tilting the objective lens by a unit angle is CMLn (unit: mλ/deg) in converging the laser light on an information recording surface Ln having a smallest light transmissive layer thickness out of the information recording surfaces of the information recording medium,
the objective lens satisfies the following mathematical expression:

$$2.5 \geq CMLn/CML0 \geq 1.5.$$

* * * * *